US012570880B2

(12) United States Patent
Morita et al.

(10) Patent No.: US 12,570,880 B2
(45) Date of Patent: Mar. 10, 2026

(54) TRANSPARENT ADHESIVE COMPOSITION, FILM-SHAPED TRANSPARENT ADHESIVE, METHOD OF PRODUCING TRANSPARENT ADHESIVE CURED LAYER-ATTACHED MEMBER, AND ELECTRONIC COMPONENT AND METHOD OF PRODUCING THE SAME

(71) Applicant: FURUKAWA ELECTRIC CO., LTD., Tokyo (JP)

(72) Inventors: Minoru Morita, Tokyo (JP); Koyuki Sakai, Tokyo (JP); Keita Watahiki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 1035 days.

(21) Appl. No.: 17/686,190

(22) Filed: Mar. 3, 2022

(65) Prior Publication Data

US 2022/0186095 A1 Jun. 16, 2022

Related U.S. Application Data

(63) Continuation of application No. PCT/JP2021/020043, filed on May 26, 2021.

(30) Foreign Application Priority Data

Sep. 29, 2020 (JP) ................................ 2020-163561

(51) Int. Cl.
*C09J 163/00* (2006.01)

(52) U.S. Cl.
CPC .................................. *C09J 163/00* (2013.01)

(58) Field of Classification Search
CPC ...................................................... C09J 163/00
See application file for complete search history.

(56) References Cited

U.S. PATENT DOCUMENTS

| | | | |
|---|---|---|---|
| 9,296,925 | B2 | 3/2016 | Wakayama et al. |
| 2015/0225613 | A1 | 8/2015 | Wakayama et al. |
| 2019/0181113 | A1 | 6/2019 | Morita et al. |

FOREIGN PATENT DOCUMENTS

| | | | |
|---|---|---|---|
| CN | 106575625 | A | 4/2017 |
| JP | 6-256746 | A | 9/1994 |

(Continued)

OTHER PUBLICATIONS

Taiwanese Office Action and Search Report for corresponding Taiwanese Application No. 110119413, dated Apr. 12, 2022, with English translation.

(Continued)

*Primary Examiner* — Catherine S Branch
*Assistant Examiner* — Andrea Wu
(74) *Attorney, Agent, or Firm* — Birch, Stewart, Kolasch & Birch, LLP

(57) ABSTRACT

A transparent adhesive composition including an epoxy resin (A), an epoxy resin-curing agent (B), and a phenoxy resin (C), wherein the epoxy resin-curing agent (B) satisfies the following (1) and (2):

(1) the epoxy resin-curing agent (B) is in a powdery form and has a particle diameter (d90) at 90% cumulative distribution frequency of 2.0 μm or less; and (2) the epoxy resin-curing agent (B) has solubility in 100 g of methyl ethyl ketone at 25° C. of 0.1 g or less;

a film-shaped transparent adhesive processed therefrom;

a method of producing a transparent adhesive cured layer-attached member by using the film-shaped transparent adhesive;

a method of producing an electronic component; and an electronic component.

13 Claims, 2 Drawing Sheets

(56) References Cited

FOREIGN PATENT DOCUMENTS

| | | | |
|---|---|---|---|
| JP | 2011-26457 | A | 2/2011 |
| JP | 2016-58457 | A | 4/2016 |
| JP | 6336905 | B2 | 6/2018 |
| JP | 2019-143085 | A | 8/2019 |
| JP | 2021-34574 | A | 3/2021 |
| TW | 201918536 | A | 5/2019 |
| WO | WO 2014/054631 | A1 | 4/2014 |

OTHER PUBLICATIONS

Korean Office Action for corresponding Korean Application No. 10-2022-7003101, dated Dec. 6, 2023, with English translation.
International Search Report for PCT/JP2021/020043 (PCT/ISA/210) mailed on Jul. 27, 2021.
Written Opinion of the International Searching Authority for PCT/JP2021/020043 (PCT/ISA/237) mailed on Jul. 27, 2021.

TRANSPARENT ADHESIVE COMPOSITION, FILM-SHAPED TRANSPARENT ADHESIVE, METHOD OF PRODUCING TRANSPARENT ADHESIVE CURED LAYER-ATTACHED MEMBER, AND ELECTRONIC COMPONENT AND METHOD OF PRODUCING THE SAME

CROSS-REFERENCE TO RELATED APPLICATIONS

This application is a Continuation of PCT International Application No. PCT/JP2021/020043 filed on May 26, 2021, which claims priority under 35 U.S.C. § 119 (a) to Japanese Patent Application No. 2020-163561 filed in Japan on Sep. 29, 2020. Each of the above applications is hereby expressly incorporated by reference, in its entirely, into the present application.

FIELD OF THE INVENTION

The present invention relates to a transparent adhesive composition, a film-shaped transparent adhesive, a method of producing a transparent adhesive cured layer-attached member, and an electronic component and a method of producing the same.

BACKGROUND OF THE INVENTION

For example, 3D sensing and resolution enhancement of electronic devices have recently progressed. This increases a demand for optical devices such as optical lenses, optical fibers, optical waveguides, optical isolators, and semiconductor lasers in, for instance, automobile, mobile, security, and industrial fields. A transparent member such as a lens or glass is mounted in each optical device via an adhesive with transparency (transparent adhesive).

As the transparent adhesive, a paste-like adhesive has been conventionally used. However, the paste-like adhesive is likely to cause problems such as protrusion from an adhesion site during bonding. Thus, film-shaped adhesives have recently been frequently used as the transparent adhesives.

In addition, each film-shaped transparent adhesive is also used as a die attach film in the manufacture of semiconductor devices for bonding between a circuit board and a semiconductor chip and bonding between semiconductor chips (what is called die attach).

As a film-shaped transparent adhesive, Patent Literature 1 discloses a film-shaped adhesive including a binder resin (A), an epoxy resin (B), a thermosetting agent (C), and a filler (D), wherein a content of the epoxy resin (B) is 100 to 1000 parts by mass with respect to 100 parts by mass of the binder resin (A), an average particle diameter of the filler (D) is 50 nm or less, a total light transmittance in D65 standard light source is 70% or more, and the haze value is 50% or less. A form using an acrylic resin as the binder resin has been shown as a specific embodiment of this film-shaped adhesive.

CITATION LIST

Patent Literatures

Patent Literature 1: Japanese Patent No. 6336905

SUMMARY OF THE INVENTION

Technical Problem

A transparent member may be mounted on, for example, an optical device. In this case, a site of the transparent member may be provided with an alignment mark. A film-shaped transparent adhesive may be attached onto the alignment mark by, for example, thermocompression bonding. The transparent member may be bonded via the film-shaped transparent adhesive to another member while the alignment mark is optically recognized through the attached film-shaped transparent adhesive. In this case, as the alignment mark is structured more finely, the film-shaped transparent adhesive is required to have higher visibility of the alignment mark (higher transparency of the adhesive). When a film-shaped transparent adhesive is used for bonding a transparent member, desired transparency should be maintained even after the adhesive is cured.

In addition, the film-shaped transparent adhesive may also be cured while attached to, for instance, a transparent member to function as a protective film for the transparent member. Even in the use as such a protective film, it may be required to secure the visibility of the alignment mark through the protective film when the protective film-attached transparent member is implemented, etc.

The film-shaped transparent adhesive should have storage stability, namely characteristics capable of maintaining a function as an adhesive until use. However, when an uncured film-shaped transparent adhesive is left to stand, for example, at room temperature (25° C.), a curing reaction gradually proceeds, and desired bonding performance is not necessarily exploited. Thus, it is important to improve the storage stability in performance of the film-shaped transparent adhesive.

In a film-shaped transparent adhesive using an epoxy resin, it has been known to use a solid epoxy resin-curing agent at room temperature in order to enhance storage stability. Meanwhile, the present inventors have conducted research. Here, in order to make a curing reaction proceed efficiently, the thermosetting temperature was set to a relatively low temperature (e.g., about 120° C.) and a large amount of a curing agent was added. This case has been found to cause a decrease in the transparency, resulting in poor recognition of an alignment mark through this cured film.

The present invention has been made in view of the problems with the prior art, and provides a film-shaped transparent adhesive that exhibits sufficient transparency after curing and has increased storage stability at room temperature, a method of producing a transparent adhesive cured layer-attached member using this adhesive, an electronic component, and a method of producing the electronic component. In addition, the present invention provides a transparent adhesive composition suitable for preparation of the film-shaped transparent adhesive.

Solution to Problem

As a result of intensive research in view of the above problems, the present inventors have adopted a combination of an epoxy resin, an epoxy resin-curing agent, and a phenoxy resin as raw materials for a film-shaped transparent adhesive. In addition, this epoxy resin-curing agent used was prepared as powder with a specific particle diameter and had low solvent solubility. This has been found to solve the above problems.

The present invention is based on these findings, and after further investigation, has been completed.

The above problems of the present invention have been solved by the following means.

[1]

A transparent adhesive composition, including an epoxy resin (A), an epoxy resin-curing agent (B), and a phenoxy resin (C), wherein the epoxy resin-curing agent (B) satisfies the following (1) and (2): (1) the epoxy resin-curing agent (B) is in a powdery form and has a particle diameter (d90) at 90% cumulative distribution frequency of 2.0 μm or less; and (2) the epoxy resin-curing agent (B) has solubility in 100 g of methyl ethyl ketone at 25° C. of 0.1 g or less.

[2]

The transparent adhesive composition described in [1], including a silica filler (D1), wherein the silica filler (D1) satisfies the following (3) and (4):

(3) the silica filler (D1) has an average particle diameter (d50) of from 0.01 to 0.3 μm; and (4) the silica filler (D1) has a particle diameter (d90) at 90% cumulative distribution frequency of 1.0 μm or less, and wherein a percentage of a content of the silica filler (D1) to a total of contents of the epoxy resin (A), the epoxy resin-curing agent (B), the phenoxy resin (C), and the silica filler (D1) is from 10 to 50 mass %.

[3]

The transparent adhesive composition described in [1] or [2], wherein the epoxy resin-curing agent (B) includes a dicyandiamide compound, an imidazole compound, or a hydrazide compound.

[4]

The transparent adhesive composition described in any one of [1] to [3], wherein a content of the epoxy resin-curing agent (B) based on 100 parts by mass of the epoxy resin (A) is from 4 to 20 parts by mass.

[5]

A film-shaped transparent adhesive, which is obtained by forming a film of the transparent adhesive composition described in any one of [1] to [4].

[6]

The film-shaped transparent adhesive described in [5], which has a haze value of 50% or less after thermal curing.

[7]

The film-shaped transparent adhesive described in [5] or [6], wherein when the film-shaped transparent adhesive before thermal curing is heated from 25° C. at a heating rate of 5° C./min, a melt viscosity at 120° C. reaches a range of 100 to 10,000 Pa·s.

[8]

The film-shaped transparent adhesive described in any one of [5] to [7], which has a thickness of from 1 to 100 μm.

[9]

A method of producing a transparent adhesive cured layer-attached member, including the steps of:

thermocompression bonding the film-shaped transparent adhesive described in any one of [5] to [8] onto an adherend; and thermally curing the film-shaped transparent adhesive.

[10]

A method of producing an electronic component, including the steps of:

a first step of thermocompression bonding the film-shaped transparent adhesive described in any one of [5] to [8] to a surface of a wafer and providing a dicing tape via the film-shaped transparent adhesive;

a second step of dicing the wafer and the film-shaped transparent adhesive simultaneously to obtain a wafer chip with a transparent adhesive layer on the dicing tape;

a third step of removing the dicing tape from the transparent adhesive layer and thermocompression bonding the transparent adhesive layer-attached wafer chip and another member via the transparent adhesive layer; and a fourth step of thermally curing the transparent adhesive layer.

[11]

An electronic component, which is obtained by bonding a wafer chip and a circuit board and/or wafer chips to each other by using a thermally cured product of the film-shaped transparent adhesive described in any one of [5] to [8].

As used herein, the numerical ranges expressed with the term "to" refer to ranges including, as the lower limit and the upper limit, the numerical values before and after the term "to".

As used herein, (meth)acryl means either or both of acryl and methacryl. The same applies to (meth)acrylate.

Advantageous Effects of Invention

The film-shaped transparent adhesive of the present invention is excellent in transparency even after thermal curing, and also has excellent storage stability at room temperature.

The film-shaped transparent adhesive can be obtained by forming a film of the transparent adhesive composition of the present invention.

The method of producing a transparent adhesive cured layer-attached member according to the present invention may be used to prepare a member provided with a cured layer (e.g., a protective layer) having excellent transparency.

The method of producing an electronic component according to the present invention may be used to produce an electronic component having a highly transparent cured layer in the present invention.

DESCRIPTION OF EMBODIMENTS

<<Transparent Adhesive Composition>>

Figure 1:
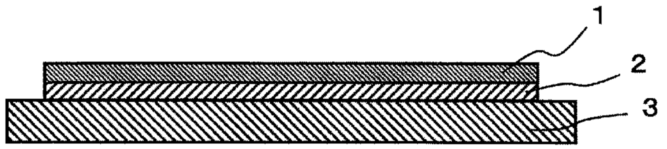
FIG. 1 is a schematic longitudinal cross-sectional view illustrating a preferred embodiment of a first step of a method of producing an electronic component according to the present invention.

A transparent adhesive composition of the present invention contains an epoxy resin (A), an epoxy resin-curing agent (B), and a phenoxy resin (C). In the transparent adhesive composition of the present invention, the epoxy resin-curing agent (B) satisfies the following (1) and (2).

(1) The epoxy resin-curing agent (B) is in a powdery form and has a particle diameter (d90) at 90% cumulative distribution frequency of 2.0 μm or less.

(2) The epoxy resin-curing agent (B) has solubility in 100 g of methyl ethyl ketone (MEK) at 25° C. of 0.1 g or less (i.e., the solubility in MEK at 25° C. of 0.1 g/100 g-MEK or less (the mass of the epoxy resin-curing agent soluble in 100 g of MEK at 25° C. is 0.1 g or less)).

In the case of "transparent", the degree of transparency herein is not particularly limited as long as having transparency. For example, a material of interest may be colorless and transparent, colored and transparent, or semitransparent.

As used herein, the phenomenon that the epoxy resin-curing agent (B) is in a powdery form means that the epoxy resin-curing agent (B) is in the form of solid particles at room temperature (25° C.; the same applies to the following).

The epoxy resin-curing agent (B) has a particle diameter (d90) at 90% cumulative distribution frequency of 2.0 μm or less. The particle diameter (d90) at 90% cumulative distribution frequency means a particle diameter at which the cumulative volume is 90% when the total volume of the particles is defined as 100% in the cumulative distribution as measured by laser diffraction/scattering.

The epoxy resin-curing agent (B) used may be a commercially available product. The above "particle diameter (d90) at 90% cumulative distribution frequency of 2.0 μm or less" can also be met by, for instance, pulverization or screening, if necessary.

The solubility of the epoxy resin-curing agent (B) in MEK at room temperature (25° C.) is 0.1 g/100 g-MEK or less. This solubility means the maximum amount of the epoxy resin-curing agent (B) that can be dissolved in 100 g of MEK at room temperature. Here, MEK is widely used as a solvent used for a liquid composition obtained by dissolving an epoxy resin. Hence, the solubility of the epoxy resin-curing agent (B) in MEK at room temperature of 0.1 g/100 g-MEK or less indicates that the epoxy resin-curing agent (B) is hardly dissolved in the transparent adhesive composition. Note that a solvent other than MEK may be used for the transparent adhesive composition. Even in this case, if the solubility of the epoxy resin-curing agent (B) in MEK at room temperature is 0.1 g/100 g-MEK or less, the epoxy resin-curing agent (B) is hardly dissolved in the solvent in a manner similar to the case of MEK.

From the viewpoint of storage stability and transparency, the particle diameter (d90) of the epoxy resin-curing agent (B) at 90% cumulative distribution frequency is preferably from 0.05 to 2.0 μm, more preferably from 0.1 to 2.0 μm, further preferably from 0.2 to 2.0 μm, and particularly preferably from 0.3 to 1.0 μm.

From the viewpoint of storage stability and transparency, the solubility of the epoxy resin-curing agent (B) in MEK at room temperature is preferably from 0.005 to 0.1 g/100 g-MEK and more preferably from 0.005 to 0.01 g/100 g-MEK.

The transparent adhesive composition of the present invention may further contain an inorganic filler (D). The inorganic filler (D) will be described later.

Hereinafter, each component contained in the transparent adhesive composition will be described.

(Epoxy Resin (A))

The epoxy resin (A) is a thermosetting resin having an epoxy group, and has an epoxy equivalent of 500 g/eq or less. The epoxy resin (A) may be liquid, solid, or semi-solid. The liquid in the present invention means that the softening point is less than 25° C. The solid means that the softening point is 60° C. or more. The semi-solid means that the softening point is between the softening point of the liquid and the softening point of the solid (25° C. or more and less than 60° C.). The softening point of the epoxy resin (A) used in the present invention is preferably 100° C. or less from the viewpoint of obtaining a film-shaped transparent adhesive that can reach low melt viscosity in a preferable temperature range (e.g., 60 to 120° C.). Incidentally, in the present invention, the softening point is a value measured by the softening point test (ring and ball) method (measurement condition: in accordance with JIS-2817).

In the epoxy resin (A) used in the present invention, the epoxy equivalent is preferably from 150 to 450 g/eq from the viewpoint of increasing the crosslinking density of a thermally cured product of the film-shaped transparent adhesive. Incidentally, in the present invention, the epoxy equivalent refers to the number of grams of a resin containing 1 gram equivalent of epoxy group (g/eq).

The mass average molecular weight of the epoxy resin (A) is usually preferably less than 10,000 and more preferably 5,000 or less. The lower limit is not particularly limited, but is practically 300 or more.

The mass average molecular weight is a value obtained by GPC (Gel Permeation Chromatography) analysis.

Examples of the skeleton of the epoxy resin (A) include a phenol novolac type, an orthocresol novolac type, a cresol novolac type, a dicyclopentadiene type, a biphenyl type, a fluorene bisphenol type, a triazine type, a naphthol type, a naphthalene diol type, a triphenylmethane type, a tetraphenyl type, a bisphenol A type, a bisphenol F type, a bisphenol AD type, a bisphenol S type, or a trimethylolmethane type. Among them, a triphenylmethane type, a bisphenol A type, a cresol novolac type, and an orthocresol novolac type are preferable from the viewpoint of providing a film-shaped transparent adhesive having low resin crystallinity and good appearance. They may be used singly or two or more kinds thereof may be used in combination, and a combination of a triphenylmethane type and a bisphenol A type is preferable.

The content of the epoxy resin (A) is preferably 3 to 80 parts by mass, more preferably 30 to 70 parts by mass, and further preferably 40 to 70 parts by mass based on 100 parts by mass of the total content of components constituting the film-shaped transparent adhesive (specifically, components other than a solvent) in the transparent adhesive composition of the present invention. By setting the content within the above preferred range, storage stability and transparency can be enhanced. Meanwhile, by adjusting the content to the preferable upper limit or less, generation of oligomer components can be suppressed, and the state of the film (e.g., film tack property) is unlikely to be changed in the case of a small change in temperature.

(Epoxy Resin-Curing Agent (B))

The epoxy resin-curing agent (B) is not particularly limited as long as it satisfies the above (1) and (2), and any curing agent such as amines, acid anhydrides, or polyhydric phenols may be used. From the viewpoint of obtaining a film-shaped transparent adhesive having high storage stability, it is preferable to herein use a latent curing agent. The latent curing agent may be used to produce a film-shaped transparent adhesive having a low melt viscosity, exhibiting thermosetting properties at a high temperature exceeding a certain temperature, and having fast curing performance.

Examples of the latent curing agent include a dicyandiamide compound, an imidazole compound, a curing catalyst composite-based polyhydric phenol compound, a hydrazide compound, a boron trifluoride-amine complex, an amine imide compound, a polyamine salt, a modified product thereof, and those of a microcapsule type. The dicyandiamide compound, the imidazole compound, and the hydrazide compound are preferable. They may be used singly, or in combination of two or more kinds thereof. Use of an imidazole compound is more preferable from the viewpoint of providing even better latency (properties of excellent stability at room temperature and exhibiting curability by heating) and providing a more rapid curing rate.

From the viewpoint of storage stability and transparency, the percentage of the content of the epoxy resin-curing agent (B) to the total of the contents of the epoxy resin (A), the epoxy resin-curing agent (B), the phenoxy resin (C), and the inorganic filler (D) is preferably from 1 to 30 mass %, more preferably from 1 to 20 mass %, further preferably from 2 to 15 mass %, further preferably from 2 to 10 mass %, and particularly preferably from 3 to 6 mass %.

The content of the epoxy resin-curing agent (B) based on 100 parts by mass of the epoxy resin (A) is preferably from 0.5 to 100 parts by mass, more preferably from 1 to 80 parts by mass, further preferably from 2 to 50 parts by mass, further preferably from 4 to 20 parts by mass, and particularly preferably from 4 to 12 parts by mass. Setting the content to the preferable lower limit or more can further reduce the curing time, while setting the content to the preferable upper limit or less can prevent the curing agent from excessively remaining in the film-shaped transparent adhesive. As a result, moisture absorption by the remaining curing agent can be suppressed, and thus the reliability of the semiconductor device can be improved. Furthermore, from the viewpoint of enhancing the low-temperature curability, the content is preferably within the above range.

(Phenoxy Resin (C))

The phenoxy resin (C) is a component that suppresses film tackiness at room temperature (25° C.) and imparts film formation property (film formability) when a film-shaped transparent adhesive is formed.

The phenoxy resin (C) has an elastic modulus at room temperature (25° C.) of preferably 500 MPa or more, more preferably 2,000 MPa or less. The room-temperature (25° C.) elastic modulus may be from 1,000 to 2,000 MPa or from 1,500 to 2,000 MPa.

The room-temperature (25° C.) elastic modulus can be determined by a method described later. Incidentally, the elastic modulus at room temperature (25° C.) in a case where the transparent adhesive composition contains two or more kinds of phenoxy resins can be determined by using, as a phenoxy resin film for measurement of elastic modulus at room temperature in the method described in EXAMPLES described later, a film produced by blending the phenoxy resin at a mixing ratio for constituting the transparent adhesive composition.

Method for Measuring Elastic Modulus at Room Temperature (25° C.)

In a 500-mL separable flask, 30 parts by mass of each kind of phenoxy resins and 70 parts by mass of MEK were heated with stirring at a temperature of 110° C. for 2 hours to obtain a resin varnish.

Next, this resin varnish is applied onto a release-treated PET film (release film) having a thickness of 38 μm and then dried by heating at 130° C. for 10 minutes to obtain a phenoxy resin film having a length of 300 mm, a width of 200 mm, and a thickness of 100 μm.

This phenoxy resin film is cut into a size of 5 mm×17 mm. The cut film is measured by using a dynamic viscoelasticity measurement apparatus (trade name: Rheogel-E4000F, manufactured by UBM) under the condition at a measurement temperature range of 0 to 100° C., a heating rate of 5° C./min, and a frequency of 1 Hz. The value of the elastic modulus at 25° C. is thus obtained.

The mass average molecular weight of the phenoxy resin (C) is usually 10,000 or more. The upper limit is not particularly limited, but is practically 5,000,000 or less.

The mass average molecular weight of the phenoxy resin (C) is determined by GPC (Gel Permeation Chromatography) in terms of polystyrene.

The glass transition temperature (Tg) of the phenoxy resin (C) is preferably less than 120° C., more preferably less than 100° C., and more preferably less than 90° C. The lower limit is preferably 0° C. or higher and more preferably 10° C. or higher.

The glass transition temperature of the phenoxy resin (C) is a glass transition temperature measured by DSC at a heating rate of 0.1° C./min.

The transparent adhesive composition contains at least one kind of phenoxy resin as the phenoxy resin (C).

Note that as used herein, the phenoxy resin (C) is one having an epoxy equivalent (mass of resin per equivalent of epoxy group) of more than 500 g/eq. Specifically, a resin having an epoxy equivalent of 500 g/eq or less even though having a phenoxy resin structure is classified as the epoxy resin (A).

The phenoxy resin (C) can be obtained by a reaction of a bisphenol or biphenol compound with epihalohydrin such as epichlorohydrin, or a reaction of liquid epoxy resin with a bisphenol or biphenol compound.

In any of the reactions, the bisphenol or biphenol compound is preferably a compound represented by the following formula (A).

Formula (A)

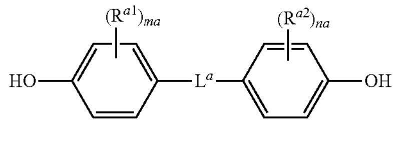

In Formula (A), $L^a$ designates a single bond or divalent linking group, and $R^{a1}$ and $R^{a2}$ each independently designate a substituent. ma and na each independently represent an integer of 0 to 4.

In $L^a$, the divalent linking group is preferably an alkylene group, a phenylene group, —O—, —S—, —SO—, $—SO_2—$, or a group in which an alkylene group and a phenylene group are combined.

The number of carbon atoms of the alkylene group is preferably 1 to 10, more preferably 1 to 6, further preferably 1 to 3, particularly preferably 1 or 2, and most preferably 1.

The alkylene group is preferably —C(R$^{\alpha}$)(R$^{\beta}$)—, and here, R$^{\alpha}$ and R$^{\beta}$ each independently designate a hydrogen atom, an alkyl group, or an aryl group. R$^{\alpha}$ and R$^{\beta}$ may be bonded to each other to form a ring. R$^{\alpha}$ and R$^{\beta}$ are preferably a hydrogen atom or an alkyl group (e.g., methyl, ethyl, isopropyl, n-propyl, n-butyl, isobutyl, hexyl, octyl, or 2-ethylhexyl). The alkylene group is, in particular, preferably $—CH_2—$, $—CH(CH_3)—$, or $C(CH_3)_2—$, more preferably $—CH_2—$ or $—CH(CH_3)—$, and further preferably $—CH_2—$.

The number of carbon atoms of the phenylene group is preferably 6 to 12, more preferably 6 to 8, and further preferably 6. Examples of the phenylene group include p-phenylene, m-phenylene, and o-phenylene, among which p-phenylene and m-phenylene are preferable.

The group in which an alkylene group and a phenylene group are combined is preferably an alkylene-phenylene-alkylene group, and more preferably —C(R$^{\alpha}$)(R$^{\beta}$)-phenylene-C(R$^{\alpha}$)(R$^{\beta}$)—.

The ring formed by bonding of R$^{\alpha}$ and R$^{\beta}$ is preferably a 5- or 6-membered ring, more preferably a cyclopentane ring or a cyclohexane ring, and further preferably a cyclohexane ring.

L$^{a}$ is preferably a single bond or an alkylene group, —O—, or $—SO_2—$, and more preferably an alkylene group.

R$^{a1}$ and R$^{a2}$ are preferably an alkyl group, an aryl group, an alkoxy group, an alkylthio group, or a halogen atom, and more preferably an alkyl group, an aryl group, or a halogen atom, and further preferably an alkyl group.

Examples of the alkylene group include ethylene, propylene, butylene, pentylene, hexylene, and octylene. Ethylene, trimethylene, tetramethylene, pentamethylene, heptamethylene, hexamethylene, and octamethylene are preferable.

nb is preferably 1 to 6, more preferably 1 to 3, and further preferably 1.

Here, when nb is 2 to 10, X is preferably ethylene or propylene, and further preferably ethylene.

Examples of the aliphatic diol compound in diglycidyl ether include ethylene glycol, propylene glycol, diethylene glycol, Methylene glycol, polyethylene glycol, 1,3-propanediol, 1,4-butanediol, 1,5-heptanediol, 1,6-hexanediol, 1,7-pentanediol, and 1,8-octanediol.

In the above reaction, the phenoxy resin is a phenoxy resin obtained by reacting a single bisphenol or biphenol compound, or an aliphatic diol compound, and may be a phenoxy resin obtained by mixing and reacting two or more kinds of bisphenol or biphenol compound, or aliphatic diol compound. For example, a reaction of diglycidyl ether of 1,6-hexanediol with a mixture of bisphenol A and bisphenol F is exemplified.

The phenoxy resin (C) used in the present invention is preferably a phenoxy resin obtained by a reaction of a liquid epoxy resin with a bisphenol or biphenol compound, and more preferably a phenoxy resin having a repeating unit represented by the following Formula (I).

Formula (I)

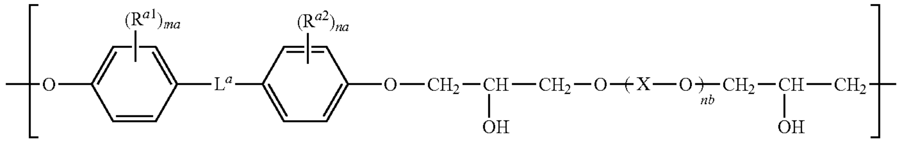

ma and na are preferably 0 to 2, more preferably 0 or 1, and further preferably 0.

Examples of the bisphenol or biphenol compound include bisphenol A, bisphenol AD, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, bisphenol Z, 4,4'-biphenol, 2,2'-dimethyl-4,4'-biphenol, 2,2',6,6'-tetramethyl-4,4'-biphenol, and cardo skeleton type bisphenol. Bisphenol A, bisphenol AD, bisphenol C, bisphenol E, bisphenol F, and 4,4'-biphenol are preferable, and bisphenol A, bisphenol E, and bisphenol F are more preferable, and bisphenol A is particularly preferable.

The liquid epoxy resin is preferably diglycidyl ether of an aliphatic diol compound, and is more preferably a compound represented by the following Formula (B).

Formula (B)

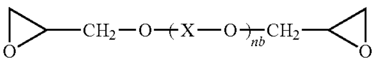

In Formula (B), X designates an alkylene group, and nb represents an integer of 1 to 10.

The number of carbon atoms of the alkylene group is preferably 2 to 10, more preferably 2 to 8, further preferably 3 to 8, particularly preferably 4 to 6, and most preferably 6.

In Formula (I), L$^{a}$, R$^{a1}$, R$^{a2}$, ma, and na have the same meaning as L$^{a}$, R$^{a1}$, R$^{a2}$, ma, and na in Formula (A), and the preferable ranges are also the same. X and nb have the same meaning as X and nb in Formula (B), and the preferable ranges are also the same.

In the present invention, a polymer of bisphenol A and diglycidyl ether of 1,6-hexanediol is preferable among these substances.

Now, focus on the skeleton of the phenoxy resin. In the present invention, a bisphenol A-type phenoxy resin or a bisphenol A-F type copolymerized phenoxy resin may be preferably used. In addition, a low-elastic high-heat-resistant phenoxy resin may be preferably used.

The mass average molecular weight of the phenoxy resin (C) is preferably 10,000 or larger and more preferably from 10,000 to 100,000.

Further, the amount of epoxy group remaining in a small amount in the phenoxy resin (C) is preferably more than 5,000 g/eq in epoxy equivalent amount.

The phenoxy resin (C) may be synthesized by the above method, or a commercially available product may be used. Examples of the commercially available product include 1256 (bisphenol A type phenoxy resin, manufactured by Mitsubishi Chemical Corporation), YP-50 (bisphenol A type phenoxy resin, manufactured by NSCC Epoxy Manufacturing Co., Ltd.), YP-70 (bisphenol A/F type phenoxy resin, manufactured by NSCC Epoxy Manufacturing Co., Ltd.), FX-316 (bisphenol F type phenoxy resin, manufactured by NSCC Epoxy Manufacturing Co., Ltd.), FX-280S (cardo skeleton type phenoxy resin, manufactured by NSCC Epoxy Manufacturing Co., Ltd.), 4250 (bisphenol A type/F type phenoxy resin, manufactured by Mitsubishi Chemical Corporation), and FX-310 (low-elastic high-heat-resistant phenoxy resin, manufactured by NSCC Epoxy Manufacturing Co., Ltd.).

The percentage of the phenoxy resin (C) in the total content of the epoxy resin (A) and the phenoxy resin (C) is from 10 to 60% by mass, preferably from 15 to 50% by mass, and more preferably from 18 to 45% by mass.

(Inorganic Filler (D))

The inorganic filler (D) used may be an inorganic filler usually used in a transparent adhesive composition as long as the effects of the present invention are not impaired.

Examples of the inorganic filler (D) include each inorganic powder made of ceramics (e.g., silica, clay, gypsum, calcium carbonate, barium sulfate, alumina (aluminum oxide), beryllium oxide, magnesium oxide, silicon carbide, silicon nitride, aluminum nitride, boron nitride), a metal or alloys (e.g., aluminum, copper, silver, gold, nickel, chromium, lead, tin, zinc, palladium, solder), and carbons (e.g., carbon nanotube, graphene).

The inorganic filler (D) is preferably a silica filler (D1) from the viewpoint of enhancing the melt viscosity and the reliability (specifically, imparting, for instance, a low linear expansion coefficient, a low water absorption rate).

From the viewpoint of storage stability and transparency, the average particle diameter (d50) of the silica filler (D1) is preferably from 0.01 to 1.0 μm, preferably from 0.01 to 0.8 μm, preferably from 0.01 to 0.3 μm, and more preferably from 0.01 to 0.2 μm.

From the viewpoint of storage stability and transparency, the particle diameter (d90) of the silica filler (D1) at 90% cumulative distribution frequency is preferably from 0.05 to 2.0 μm, preferably from 0.05 to 1.0 μm, and more preferably from 0.1 to 1.0 μm. The particle diameter (d90) of the silica filler (D1) at 90% cumulative distribution frequency is also preferably 1.0 μm or less.

From the viewpoint of storage stability and transparency, the silica filler (D1) more preferably satisfies the following (3) and (4).

(3) The silica filler (D1) has an average particle diameter (d50) of from 0.01 to 0.3 μm.

(4) The silica filler (D1) has a particle diameter (d90) at 90% cumulative distribution frequency of 1.0 μm or less.

Here, the average particle diameter (d50) is what is called a median diameter, and refers to a particle diameter at which the cumulative volume is 50% when the particle diameter distribution is measured by laser diffraction/scattering and the total volume of the particles is defined as 100% in the cumulative distribution.

The particle diameter (d90) at 90% cumulative distribution frequency has the same meaning as the particle diameter (d90) at 90% cumulative distribution frequency as described in the epoxy resin-curing agent (B).

When the inorganic filler (D) other than the silica filler (D1) is used, the ranges and the preferred ranges of the average particle diameter (d50) and the particle diameter (d90) at 90% cumulative distribution frequency of the inorganic filler (D) can be the ranges and the preferred ranges described for the silica filler (D1).

The percentage of the content of the inorganic filler (D) to the total (total solid content) of the contents of the epoxy resin (A), the epoxy resin-curing agent (B), the phenoxy resin (C), and the inorganic filler (D) is preferably from 10 to 50 mass %, and more preferably from 10 to 30 mass %.

The percentage of the content of the silica filler (D1) to the total of the contents of the epoxy resin (A), the epoxy resin-curing agent (B), the phenoxy resin (C), and the silica filler (D1) is preferably from 10 to 50 mass % and more preferably from 10 to 30 mass %.

A method of blending the inorganic filler (D) to resin components such as the epoxy resin (A), the epoxy resin-curing agent (B), and the phenoxy resin (C) includes a method in which a powder inorganic filler and, if necessary, a silane coupling agent, phosphoric acid or a phosphoric acid compound, and a surfactant are directly blended (integral blending method), and a method in which a slurry inorganic filler obtained by dispersing an inorganic filler treated with a surface treatment agent such as a silane coupling agent, phosphoric acid or a phosphoric acid compound, and a surfactant in an organic solvent is blended.

A method of treating the inorganic filler (D) with a silane coupling agent is not particularly limited. Examples thereof include a wet method of mixing the inorganic filler (D) and a silane coupling agent in a solvent, a dry method of mixing the inorganic filler (D) and a silane coupling agent in a gas phase, and the above integral blending method.

The silane coupling agent is a compound in which at least one hydrolyzable group such as an alkoxy group or an aryloxy group is bonded to a silicon atom. In addition to these groups, an alkyl group, an alkenyl group, or an aryl group may be bonded to the silicon atom. The alkyl group is preferably an alkyl group substituted with an amino group, an alkoxy group, an epoxy group, or a (meth)acryloyloxy group, and more preferably an alkyl group substituted with an amino group (preferably a phenylamino group), an alkoxy group (preferably a glycidyloxy group), or a (meth) acryloyloxy group.

Examples of the silane coupling agent include 2-(3,4-epoxycyclohexyl)ethyltrimethoxysilane, 3-glycidyloxypropyltrimethoxysilane, 3-glycidyloxypropyltriethoxysilane, 3-glycidyloxypropylmethyldimethoxysilane, 3-glycidyloxypropylmethyldiethoxysilane, dimethyldimethoxysilane, dimethyldiethoxysilane, methyltrimethoxysilane, methyltriethoxysilane, phenyltrimethoxysilane, phenyltriethoxysilane, N-phenyl-3-aminopropyltrimethoxysilane, 3-methacryloyloxypropylmethyldimethoxysilane, 3-methacryloyloxypropyltrimethoxysilane, 3-methacryloyloxypropylmethyldiethoxysilane, and 3-methacryloyloxypropyltriethoxysilane.

The silane coupling agent and the surfactant are contained in an amount of preferably 0.1 to 25.0 parts by mass, more preferably 0.1 to 10 parts by mass, and further preferably 0.1 to 2.0 parts by mass based on 100 parts by mass of the inorganic filler (D).

By adjusting the content of the silane coupling agent or the surfactant to the preferable range, it is possible to suppress peeling at the adhesion interface due to volatilization of an excessive silane coupling agent and surfactant in the heating process in semiconductor assembling (for example, a reflow process) while aggregation of the inorganic filler (D) is suppressed. As a result, generation of voids can be suppressed and die attachment can be improved.

Examples of the shape of the inorganic filler (D) include a flake shape, a needle shape, a filament shape, a spherical shape, and a scale shape. Here, a spherical particle is preferable from the viewpoint of achieving higher filling and fluidity.

From the viewpoint of transparency, it is preferable not to use the silica filler (D1). When the silica filler (D1) is used, the average particle diameter (d50) of the silica filler (D1) is preferably from 0.01 to 0.3 μm, and the percentage of the content of the silica filler (D1) to the total (total solid content) of the contents of the epoxy resin (A), the epoxy resin-curing agent (B), the phenoxy resin (C), and the silica filler (D1) is preferably from 10 to 30 mass %.

A preferred embodiment of the transparent adhesive composition of the present invention is in a form in which the silica filler (D1) is contained, the silica filler (D1) satisfies the above (3) and (4), and the percentage of the content of the silica filler (D1) to the total (total solid content) of the contents of the epoxy resin (A), the epoxy resin-curing agent (B), the phenoxy resin (C), and the silica filler (D1) is from 10 to 50 mass %.

(Other Components)

The transparent adhesive composition of the present invention may contain a polymer compound in addition to the epoxy resin (A), the epoxy resin-curing agent (B), and the phenoxy resin (C) as long as the effects of the present invention are not impaired.

Examples of the polymer compound include natural rubber, butyl rubber, isoprene rubber, chloroprene rubber, silicone rubber, an ethylene-vinyl acetate copolymer, an ethylene-(meth)acrylic acid copolymer, an ethylene-(meth) acrylic acid ester copolymer, polybutadiene resin, polycarbonate resin, thermoplastic polyimide resin, polyamide resins such as 6-nylon and 6,6-nylon, (meth)acrylic resin, polyester resins such as polyethylene terephthalate and polybutylene terephthalate, polyamideimide resin, and fluororesin. These polymer compounds may be used singly, or in combination of two or more kinds thereof.

The transparent adhesive composition of the present invention preferably contains an organic solvent (e.g., MEK). When the transparent adhesive composition of the present invention contains a solvent, the proportion of MEK in the solvent is preferably 40 mass % or larger, more preferably 60 mass % or larger, and further preferably 80 mass % or larger.

Further, the transparent adhesive composition of the present invention may further contain, for example, an ion trapping agent (ion capturing agent), a curing catalyst, a viscosity adjusting agent, an antioxidant, a flame retardant, and/or a coloring agent. The transparent adhesive composition may contain, for example, other additives described in WO 2017/158994.

The percentage of the total content of the epoxy resin (A), the epoxy resin-curing agent (B) and the phenoxy resin (C), or the percentage of the total content of the epoxy resin (A), the epoxy resin-curing agent (B), the phenoxy resin (C) and the inorganic filler (D) in the case of containing the inorganic filler (D), in the transparent adhesive composition of the present invention can be, for example, 60% by mass or more, preferably 70% by mass or more, and further preferably 80% by mass or more, and may also be 90% by mass or more. Also, the percentage may be 100% by mass, and can be 95% by mass or less.

The transparent adhesive composition of the present invention can be suitably used for obtaining the film-shaped transparent adhesive of the present invention. However, the transparent adhesive composition of the present invention is not limited to the film-shaped transparent adhesive, and can also be suitably used for a liquid adhesive.

The transparent adhesive composition of the present invention can be obtained by mixing the above components at a temperature at which the epoxy resin (A) is practically not thermally cured. The order of mixing is not particularly limited. Resin components such as the epoxy resin (A) and the phenoxy resin (C) may be mixed together with a solvent, if necessary, and the inorganic filler (D) and the epoxy resin-curing agent (B) may then be mixed. In this case, the mixing in the presence of the epoxy resin-curing agent (B) may be performed at a temperature at which the epoxy resin (A) is practically not thermally cured, and the mixing of the resin components in the absence of the epoxy resin-curing agent (B) may be performed at a higher temperature.

From the viewpoint of suppressing thermal curing of the epoxy resin (A), the transparent adhesive composition of the present invention is preferably stored under a temperature condition at 10° C. or lower before use (before being formed into a film-shaped transparent adhesive).

<<Film-Shaped Transparent Adhesive>>

The film-shaped transparent adhesive of the present invention is a film-shaped adhesive obtained by forming a film of the transparent adhesive composition of the present invention, and contains the epoxy resin (A), the epoxy resin-curing agent (B), and the phenoxy resin (C) described above.

The invention of the film-shaped transparent adhesive described herein can be specified as follows.

A film-shaped transparent adhesive obtained by forming a film of a transparent adhesive composition containing an epoxy resin (A), an epoxy resin-curing agent (B), and a phenoxy resin (C), wherein the epoxy resin-curing agent (B) satisfies the following (1) and (2).

(1) The epoxy resin-curing agent (B) is in a powdery form and has a particle diameter (d90) at 90% cumulative distribution frequency of 2.0 μm or less.

(2) The epoxy resin-curing agent (B) has solubility in 100 g of methyl ethyl ketone at 25° C. of 0.1 g or less.

The film-shaped transparent adhesive of the present invention may contain the above-described inorganic filler (D) in addition to the epoxy resin (A), the epoxy resin-curing agent (B), and the phenoxy resin (C), and may contain an additive other than the organic solvent among the additives described as other additives in the transparent adhesive composition of the present invention. The organic solvent is usually removed from the transparent adhesive composition by drying in the step of forming a film of the transparent adhesive composition, but the organic solvent may be contained in the film-shaped transparent adhesive as long as the content is from about 0.1 to 1000 ppm.

The film formation is not particularly limited as long as the transparent adhesive composition can be formed into a film shape. This can be performed by, for instance, coating described later.

Here, the "film" herein means a film having a thickness of 200 μm or less. The shape and size, etc., of the film is not particularly limited, and can be adjusted, if appropriate, in accordance with the use form.

The film-shaped transparent adhesive has thermosetting properties, can be thermocompression bonded before thermosetting, and does not exhibit thermocompression bonding properties after thermosetting.

As used herein, the film-shaped transparent adhesive before thermal curing refers to one in which the epoxy resin (A) is in a state before thermal curing. The film-shaped transparent adhesive before thermal curing specifically means a film-shaped transparent adhesive which is not exposed to a temperature condition at 25° C. or higher after formation of the film-shaped transparent adhesive. On the other hand, the film-shaped transparent adhesive after thermal curing refers to one in which the epoxy resin (A) is thermally cured. Specifically, the film-shaped transparent adhesive is exposed to a temperature condition equal to or higher than the thermal curing start temperature of the film-shaped transparent adhesive of the present invention.

Note that the above descriptions are provided to clarify the characteristics of the film-shaped transparent adhesive of the present invention, and the film-shaped transparent adhesive of the present invention is not limited to one that is not exposed to a temperature condition at 25° C. or higher.

In the film-shaped transparent adhesive, the epoxy resin-curing agent (B) is melted/reacted with a component in the adhesive and incorporated into a resin component depending on the kind of the epoxy resin-curing agent (B) in the film-shaped transparent adhesive after thermocompression bonding and/or after thermal curing. However, it is preferable that at least part of the epoxy resin-curing agent (B) is present while a powdery form is maintained by, for example, recrystallization.

The haze value of the film-shaped transparent adhesive of the present invention after thermal curing is not particularly limited, and is preferably 50% or less, more preferably 45% or less, and further preferably 40% or less. The lower the haze value, the easier the alignment mark is visually recognized through the film-shaped transparent adhesive before and after thermal curing. The lower limit of the haze value is not particularly limited, but practically 1% or more. The haze value is determined in accordance with JIS K7136.

The haze value can be controlled by the content of the epoxy resin-curing agent (B) and/or the inorganic filler (D), the kind of the epoxy resin-curing agent (B) and/or the inorganic filler (D), the kinds of coexisting compounds or resins such as the epoxy resin (A) and the phenoxy resin (C), and the contents thereof. The haze value tends to decrease as the average particle diameter of the epoxy resin-curing agent (B) and/or the inorganic filler (D) decreases or as the content decreases.

In the film-shaped transparent adhesive of the present invention, when the film-shaped transparent adhesive before thermal curing is heated from 25° C. at a heating rate of 5° C./min, the melt viscosity at 120° C. is preferably in the range of 100 to 10,000 Pa·s, more preferably in the range of 200 to 10,000 Pa·s, more preferably in the range of 500 to 10,000 Pa·s, more preferably in the range of 1,000 to 10,000 Pa·s, more preferably in the range of 1,500 to 10,000 Pa·s, more preferably in the range of 8,000 to 10,000 Pa·s, and further preferably in the range of 8,000 to 9,200 Pa·s from the viewpoint of enhancing the die attachment. When the melt viscosity at 120° C. is within the above preferred range, generation of voids can be more effectively reduced. The melt viscosity of the film-shaped transparent adhesive of the present invention may be in the range of 300 to 4,000 Pa·s or in the range of 1,000 to 3,500 Pa·s.

The melt viscosity can be determined by the method described in EXAMPLES described later.

The melt viscosity can be controlled by the content of the epoxy resin-curing agent (B) and/or the inorganic filler (D), the kind of the epoxy resin-curing agent (B) and/or the inorganic filler (D), the kinds of coexisting compounds or resins such as the epoxy resin (A) and the phenoxy resin (C), and the contents thereof. The melt viscosity tends to increase as the average particle diameter of the epoxy resin-curing agent (B) and/or the inorganic filler (D) decreases and/or the content thereof increases.

The film-shaped transparent adhesive of the present invention preferably has a thickness of 1 to 100 μm. The thickness is more preferably from 1 to 60 μm, further preferably from 3 to 30 μm, and particularly preferably from 5 to 20 μm.

The thickness of the film-shaped transparent adhesive can be measured by a contact type linear gauge method (with a desk-top contact type thickness-meter).

The method of preparing the film-shaped transparent adhesive of the present invention is not particularly limited. For example, the film-shaped transparent adhesive can be formed by preparing the transparent adhesive composition (varnish) of the present invention, applying the composition onto a release-treated substrate film, and drying the composition as necessary. The transparent adhesive composition usually contains an organic solvent.

As the release-treated substrate film, any release-treated substrate film that functions as a cover film of the resulting film-shaped transparent adhesive can be used, and a publicly known film can be employed, if appropriate. Examples thereof include release-treated polypropylene (PP), release-treated polyethylene (PE), and release-treated polyethylene terephthalate (PET).

A publicly known method can be employed, if appropriate, as the application method, and examples thereof include a method using, for instance, a roll knife coater, a gravure coater, a die coater, and a reverse coater.

The drying may be performed as long as the organic solvent is removed from the transparent adhesive composition without curing the epoxy resin (A) to obtain a film-shaped transparent adhesive. The drying temperature can be set, if appropriate, depending on the kinds of the epoxy resin (A), the phenoxy resin (C), and the epoxy resin-curing agent (B) to be used. For example, the drying may be performed while holding at a temperature of, for example, 80 to 150° C. for 1 to 20 min.

The film-shaped transparent adhesive of the present invention may be formed of the film-shaped transparent adhesive of the present invention alone, or may have a form obtained by bonding a release-treated substrate film described above to at least one surface of the film-shaped transparent adhesive. The film-shaped transparent adhesive of the present invention may be in a form obtained by cutting the film into an appropriate size, or in a form obtained by winding the film into a roll form.

In the film-shaped transparent adhesive of the present invention, the arithmetic average roughness Ra of at least one surface thereof (that is, at least one surface to be bonded to an adherend) is preferably 3.0 μm or less, and the arithmetic average roughness Ra of surfaces on both sides to be bonded to the adherend is more preferably 3.0 μm or less.

The arithmetic average roughness Ra is more preferably 2.0 μm or less, and further preferably 1.5 μm or less. The lower limit is not particularly limited, but is practically 0.1 μm or more.

From the viewpoint of suppressing curing of the epoxy resin (A), the film-shaped transparent adhesive of the present invention is preferably stored under a temperature condition at 10° C. or lower before use (before curing).

The film-shaped transparent adhesive of the present invention has high storage stability, and can maintain sufficiently high transparency even when thermally cured.

Although the reason for this is not clear, it is considered that by using an epoxy resin, an epoxy resin-curing agent, which is a powdery epoxy resin-curing agent having a specific particle diameter and solubility, and a phenoxy resin, it is possible to reduce the haze value after thermal curing while improving the storage stability by reducing the compatibility between the epoxy resin-curing agent and the epoxy resin and/or the phenoxy resin before thermal curing.

<<Method of Producing Transparent Adhesive Cured Layer-Attached Member>>

The method of producing a transparent adhesive cured layer-attached member according to the present invention can be performed by a routine method except that a transparent adhesive cured layer formed of a thermally cured product of a film-shaped transparent adhesive is formed using the film-shaped transparent adhesive of the present invention to produce a transparent adhesive cured layer-attached member. The transparent adhesive cured layer functions as, for example, a protective layer for an adherend.

A preferred embodiment of the method of producing a transparent adhesive cured layer-attached member according to the present invention includes thermocompression bonding a film-shaped transparent adhesive onto an adherend, and further thermally curing the film-shaped transparent adhesive.

Examples of the adherend include a member used for an optical device (e.g., an optical lens, an optical fiber, an optical waveguide, an optical isolator, a semiconductor laser), and a member used for manufacturing an electronic component described later. In particular, the adherend is preferably a transparent member such as a lens, glass (e.g., cover glass, glass substrate, glass wafer), or a resin substrate.

The transparent adhesive cured layer may be formed using a plurality of film-shaped transparent adhesives.

The conditions for thermocompression bonding and the conditions for thermal curing are the same as the conditions for thermocompression bonding and thermal curing in the method of producing an electronic component described later.

The transparent adhesive cured layer formed in this manner exhibits substantially the same haze value as that of the film-shaped transparent adhesive after thermal curing described above. The same applies to the preferred range.

Another preferred embodiment of the method of producing a transparent adhesive cured layer-attached member according to the present invention is a method of producing an electronic component described later. The adherend in the method of producing a member with a cured transparent adhesive layer corresponds to a wafer in the method of producing an electronic component, and the transparent adhesive cured layer-attached member corresponds to an electronic component.

<<Electronic Component and Production Method Thereof>>

An electronic component of the present invention is produced by bonding at least one of a wafer chip (preferably a semiconductor chip) and a circuit board or wafer chips to each other by using a thermally cured product of the film-shaped transparent adhesive of the present invention. Ordinarily used wafer chips and circuit boards may be used. The bonding conditions will be described later in the description of the production method.

The electronic component is preferably a semiconductor package, a capacitor, a resistor, or the like, and more preferably a semiconductor package.

The method of producing an electronic component according to the present invention may be performed in substantially the same manner as in a common method of producing an electronic component except that the film-shaped transparent adhesive of the present invention is used for bonding at least one of a wafer chip and a circuit board or wafer chips.

Examples of a referred embodiment of the method of producing an electronic component according to the present invention are as follows.

Specifically, the method is a method of producing an electronic component, including the steps of:

a first step of thermocompression bonding a film-shaped transparent adhesive of the present invention to a surface of a wafer and providing a dicing tape via the film-shaped transparent adhesive;

a second step of dicing the wafer and the film-shaped transparent adhesive simultaneously (together) to obtain a wafer chip with a transparent adhesive layer on the dicing tape;

a third step of removing the dicing tape from the transparent adhesive layer and thermocompression bonding the transparent adhesive layer-attached wafer chip and another member via the transparent adhesive layer; and a fourth step of thermally curing the transparent adhesive layer.

As the wafer, a normal wafer can be used, and examples thereof include a semiconductor wafer, a glass wafer, and a ceramic wafer. Examples of the semiconductor wafer include a silicon wafer, a SiC wafer, a GaAs wafer, and a GaN wafer.

A semiconductor circuit may be or may not be formed on a surface of the wafer. At least one semiconductor circuit is preferably formed on a surface of the wafer.

The other member may be any member constituting an electronic component, and examples thereof include a circuit board, another wafer, and a bonding wire.

Another preferred embodiment of the method of producing an electronic component according to the present invention is as follows.

Specifically, the method is a method of producing a semiconductor package, including the steps of:

a first step of thermocompression bonding a film-shaped transparent adhesive of the present invention to a back surface of a semiconductor wafer, a surface of which has at least one semiconductor circuit, and providing a dicing tape via the film-shaped transparent adhesive;

a second step of dicing the semiconductor wafer and the film-shaped transparent adhesive simultaneously (together) to obtain a semiconductor chip with a transparent adhesive layer on the dicing tape;

a third step of removing the dicing tape from the transparent adhesive layer and thermocompression bonding the transparent adhesive layer-attached semiconductor chip and a circuit board via the transparent adhesive layer; and a fourth step of thermally curing the transparent adhesive layer.

Hereinafter, preferred embodiments of an electronic component and a production method thereof according to the present invention will be described in detail with reference to the drawings by exemplifying a case where a semiconductor package is manufactured using a semiconductor wafer. Note that, in the descriptions and drawings below, the same reference numerals are given to the same or corresponding components, and overlapping descriptions will be omitted. FIGS. 1 to 7 are schematic longitudinal cross-sectional views each illustrating a preferred embodiment of each step of a method of producing a semiconductor package according to the present invention. FIGS. 1 to 7 are schematic diagrams, and for convenience of description, the sizes, relative magnitude relationships, etc., of members such as semiconductor wafers may be different from actual ones.

In a preferable embodiment of the method of producing a semiconductor package according to a preferred embodiment of the present invention, as a first step, as illustrated in FIG. 1, the film-shaped transparent adhesive of the present invention is thermocompression bonded to the back surface of a semiconductor wafer 1 in which at least one semiconductor circuit is formed on a surface (that is, a surface of the semiconductor wafer 1 on which the semiconductor circuit is not formed) to provide an adhesive layer 2, and a dicing tape 3 is provided via this adhesive. At this time, a product in which the adhesive layer 2 and the dicing tape 3 are integrated may be thermocompression bonded to the back surface of the semiconductor wafer 1 at a time. For the condition of thermocompression bonding, thermocompression bonding is performed at a temperature at which the epoxy resin (A) is not thermally cured actually. Examples include the condition at a temperature of 70° C. and a pressure of 0.3 MPa.

As the adhesive layer 2, one layer of the film-shaped transparent adhesive of the present invention may be used alone, or two or more layers thereof may be layered and used. As a method of providing such an adhesive layer 2 on the back surface of the wafer 1, a method capable of laminating the film-shaped transparent adhesive on the back surface of the semiconductor wafer 1 can be employed, if appropriate. Examples thereof include a method of bonding the film-shaped transparent adhesive to the back surface of the semiconductor wafer 1 and then, in the case of laminating two or more layers, sequentially laminating the film-shaped transparent adhesives to a desired thickness, and a method of laminating the film-shaped transparent adhesives to a desired thickness in advance and then bonding this to the back surface of the semiconductor wafer 1. An apparatus used when such an adhesive layer 2 is provided on the back surface of the semiconductor wafer 1 is not particularly limited. For example, a publicly known apparatus such as a roll laminator and a manual laminator can be used, if appropriate.

The dicing tape 3 is not particularly limited, and a publicly known dicing tape can be used, if appropriate.

Figure 2:
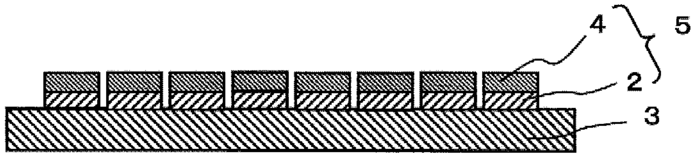
FIG. 2 is a schematic longitudinal cross-sectional view illustrating a preferred embodiment of a second step of a method of producing an electronic component according to the present invention.

Next, as a second step, the semiconductor wafer 1 and the adhesive layer 2 are simultaneously diced as illustrated in FIG. 2. Thus, a semiconductor chip 5 with a transparent adhesive layer, including the semiconductor wafer 1 (semiconductor chip 4) and the transparent adhesive layer 2 on the dicing tape 3, is obtained. Further, an apparatus used for dicing is not particularly limited, and a publicly known dicing apparatus can be used, if appropriate.

Figure 3:
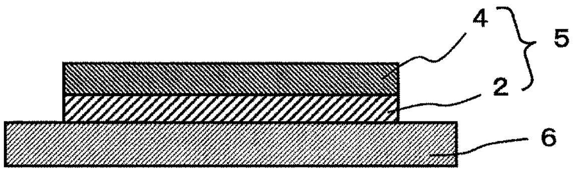
FIG. 3 is a schematic longitudinal cross-sectional view illustrating a preferred embodiment of a third step of a method of producing an electronic component according to the present invention.

Then, as a third step, as illustrated in FIG. 3, the dicing tape 3 is removed from the adhesive layer 2, and the semiconductor chip 5 with a transparent adhesive layer and the circuit board 6 are thermocompression bonded via the transparent adhesive layer 2. In this way, the semiconductor chip 5 with a transparent adhesive layer is mounted on the circuit board 6. As the circuit board 6, a substrate where a semiconductor circuit is formed on the surface can be used, if appropriate. Examples of such a substrate include a print circuit board (PCB), each lead frame, and a substrate where electronic components such as a resistive element and a capacitor are mounted on a surface of the substrate.

As a method of removing (peeling) the dicing tape 3 from the transparent adhesive layer (a method of picking up a semiconductor chip with an adhesive layer), a pickup method using an ordinary jig can be adopted. Specific examples include a method of peeling off the dicing tape 3 while using a jig such as a needle or a slider.

A method of mounting the transparent adhesive layer-attached semiconductor chip 5 on the circuit board 6 is not particularly limited. A conventional method allowing for bonding the transparent adhesive layer-attached semiconductor chip 5 via the transparent adhesive layer 2 to the circuit board 6 or an electronic component mounted on a surface of the circuit board 6 may be employed, if appropriate. Examples of such a mounting method include a publicly known heating and pressurizing method such as a method using a mounting technique using a flip chip bonder having a heating function from the upper part, a method using a die bonder having a heating function from only the lower part, and a method using a laminator. For the condition of mounting (thermocompression bonding), mounting is performed at a temperature at which the epoxy resin (A) is not thermally cured actually. Examples include the condition at a temperature of 120° C. and a pressure of 0.1 MPa for 1.0 second.

As such, mounting the transparent adhesive layer-attached semiconductor chip 5 on the circuit board 6 via the transparent adhesive layer 2 formed from the film-shaped transparent adhesive of the present invention allows the film-shaped transparent adhesive to conform to unevenness on the circuit board 5, which unevenness is formed due to the electronic component, thereby making it possible to firmly adhere and fix the semiconductor chip 4 and the circuit board 6.

Next, as a fourth step, the transparent adhesive layer 2 (film-shaped transparent adhesive of the present invention) is thermally cured to obtain a thermally cured product. The temperature for thermal curing is not particularly limited as long as it is a temperature equal to or more than the thermal curing start temperature of the film-shaped transparent adhesive of the present invention. The temperature varies depending on the kinds of the epoxy resin (A), the phenoxy resin (C), and the epoxy resin-curing agent (B) to be used. The temperature is, although it cannot be said unconditionally, for example, preferably 100 to 180° C., and more preferably 140 to 180° C. from the viewpoint that curing at a higher temperature allows curing in a short time. When the temperature is less than the thermal curing start temperature, thermal curing does not sufficiently proceed, and as a result, the strength of the adhesion layer 2 tends to decrease. On the other hand, when the temperature is more than the above upper limit, the epoxy resin, the curing agent, the additives, and the like in the film-shaped transparent adhesive volatilize during the curing process and thus tend to foam. Also, the time for curing treatment is preferably, for example, 10 to 120 minutes.

Figure 4:
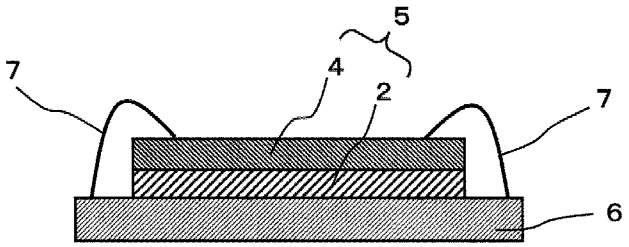
FIG. 4 is a schematic longitudinal cross-sectional view illustrating a preferred embodiment of a step of connecting a bonding wire in a method of producing an electronic component of the present invention.

Next, in the method of producing a semiconductor package according to a preferred embodiment of the present invention, it is preferable that the circuit board 6 and the adhesive layer-attached semiconductor chip 5 are connected via a bonding wire 7 as illustrated in FIG. 4. Such a connection method is not particularly limited, and a publicly known method, for example, a wire bonding method or a TAB (Tape Automated Bonding) method can be employed, if appropriate.

Figure 5:
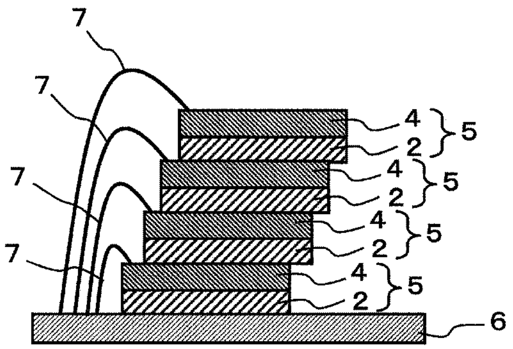
FIG. 5 is a schematic longitudinal cross-sectional view illustrating an example of an embodiment of multistacking in a method of producing an electronic component according to the present invention.
Figure 6:
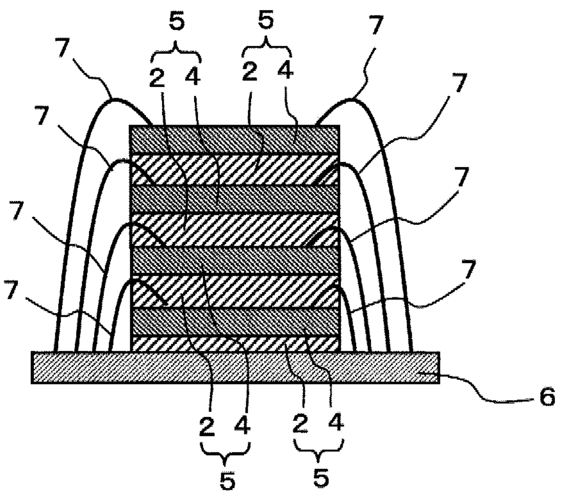
FIG. 6 is a schematic longitudinal cross-sectional view illustrating an example of another embodiment of multistacking in a method of producing an electronic component according to the present invention.

Further, a plurality of semiconductor chips 4 can be stacked by thermocompression bonding another semiconductor chip 4 to a surface of the mounted semiconductor chip 4, performing thermal curing, and then connecting the semiconductor chips 4 again to the circuit board 6 by wire bonding. Examples of the stacking method include a method of stacking the semiconductor chips in slightly different positions as illustrated in FIG. 5, and a method of stacking the semiconductor chips by increasing the thicknesses of the adhesive layers 2 of the second layer or later and thereby embedding the bonding wire 7 in each adhesive layer 2 as illustrated in FIG. 6.

Figure 7:
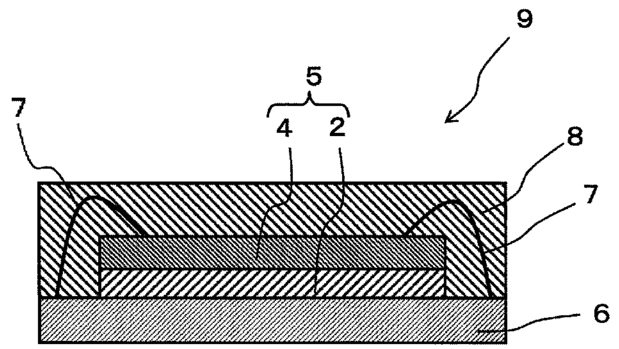
FIG. 7 is a schematic longitudinal cross-sectional view showing a preferred embodiment of an electronic component produced by the method of producing an electronic component according to the present invention.

In the method of producing a semiconductor package according to a preferred embodiment of the present invention, it is preferable to seal the circuit board 6 and the adhesive layer-attached semiconductor chip 5 with a sealing resin 8 as illustrated in FIG. 7. In this way, a semiconductor package 9 can be obtained. The sealing resin 8 is not particularly limited, and a publicly known sealing resin that can be used for the production of the semiconductor package can be used, if appropriate. In addition, a sealing method using the sealing resin 8 is not particularly limited, and a publicly known method can be employed, if appropriate.

EXAMPLES

Hereinafter, the present invention will be described in more detail based on Examples and Comparative Examples. However, the present invention is not limited to the following Examples. Also, the room temperature means 25° C., MEK is methyl ethyl ketone, and PET is polyethylene terephthalate.

The details of the pulverization of the epoxy resin-curing agent used in each of Examples or Comparative Examples and the method for measuring the particle diameter distribution before or after the pulverization will be separately described later.

Example 1

In a 1,000 mL separable flask, 56 parts by mass of triphenylmethane type epoxy resin (trade name: EPPN-501H, mass average molecular weight: 1,000, softening point: 55° C., semi-solid, epoxy equivalent amount: 167 g/eq, manufactured by Nippon Kayaku Co., Ltd.), 49 parts by mass of bisphenol A type epoxy resin (trade name: YD-128, mass average molecular weight: 400, softening point: 25° C. or less, liquid, epoxy equivalent amount: 190 g/eq, manufactured by NSCC Epoxy Manufacturing Co., Ltd.), 30 parts by mass of bisphenol A type phenoxy resin (trade name: YP-50, mass average molecular weight: 70,000, Tg: 84° C., room temperature (25° C.) elastic modulus: 1,700 MPa, manufactured by NSCC Epoxy Manufacturing Co., Ltd.), and 67 parts by mass of MEK were heated with stirring at 110° C. for 2 hours to prepare a resin varnish.

Next, this resin varnish was transferred to a 800 mL planetary mixer. Then, 53 parts by mass of silica slurry filler (trade name: YA010C-MFN, manufactured by Admatechs Co., Ltd.; average particle diameter (d50): 0.01 μm; particle diameter (d90) at 90% cumulative distribution frequency: 0.1 μm; solid content 30% (organic solvent: MEK)) (including 16 parts by mass of silica filler) was added. After that, 8.5 parts by mass of crushed imidazole compound (trade name: 2PHZ-PW, manufactured by Shikoku Chemicals Corporation; average particle diameter (d50): 0.15 μm; particle diameter (d90) at 90% cumulative distribution frequency: 0.39 μm; solubility in MEK at 25° C.: less than 0.01 g/100 g-MEK) was added. The resulting mixture was stirred and mixed at room temperature for 1 hour, and then vacuum-defoamed to prepare a mixed varnish.

Thereafter, the resulting mixed varnish was applied onto a release-treated PET film (release film) having a thickness of 38 μm and then dried by heating at 130° C. for 10 minutes to produce a release film-attached film-shaped transparent adhesive with a film-shaped transparent adhesive having a length of 300 mm, a width of 200 mm, and a thickness of 50 μm. The resulting release film-attached film-shaped transparent adhesive was stored at 10° C. or lower. After the drying, the epoxy resin was not cured (hereinafter, the same applies to other Examples and Comparative Examples unless otherwise specified).

Example 2

A release film-attached film-shaped transparent adhesive was prepared in the same manner as in Example 1 except that the usage of the silica slurry filler (trade name: YA010C-MFN, manufactured by Admatechs Co., Ltd.; average particle diameter (d50): 0.01 μm; particle diameter (d90) at 90% cumulative distribution frequency: 0.1 μm; solid content 30% (organic solvent: MEK)) was replaced by 203 parts by mass (including 61 parts by mass of the silica filler).

Example 3

A release film-attached film-shaped transparent adhesive was prepared in the same manner as in Example 1 except that the usage of the silica slurry filler (trade name: YA010C-MFN, manufactured by Admatechs Co., Ltd.; average particle diameter (d50): 0.01 μm; particle diameter (d90) at 90% cumulative distribution frequency: 0.1 μm; solid content 30% (organic solvent: MEK)) was replaced by 477 parts by mass (including 143 parts by mass of the silica filler).

Example 4

A release film-attached film-shaped transparent adhesive was prepared in the same manner as in Example 1 except that the inorganic filler was replaced by 27 parts by mass of silica slurry filler (trade name: YC100C-MLA, manufactured by Admatechs Co., Ltd.; average particle diameter (d50): 0.1 μm; particle diameter (d90) at 90% cumulative distribution frequency: 0.3 μm; solid content 60% (organic solvent: MEK)) (including 16 parts by mass of the silica filler).

Example 5

A release film-attached film-shaped transparent adhesive was prepared in the same manner as in Example 1 except that the inorganic filler was replaced by 102 parts by mass of silica slurry filler (trade name: YC100C-MLA, manufactured by Admatechs Co., Ltd.; average particle diameter (d50): 0.1 μm; particle diameter (d90) at 90% cumulative distribution frequency: 0.3 μm; solid content 60% (organic solvent: MEK)) (including 61 parts by mass of the silica filler).

Example 6

A release film-attached film-shaped transparent adhesive was prepared in the same manner as in Example 1 except that the inorganic filler was replaced by 238 parts by mass of silica slurry filler (trade name: YC100C-MLA, manufactured by Admatechs Co., Ltd.; average particle diameter (d50): 0.1 μm; particle diameter (d90) at 90% cumulative distribution frequency: 0.3 μm; solid content 60% (organic solvent: MEK)) (including 143 parts by mass of the silica filler).

Example 7

A release film-attached film-shaped transparent adhesive was prepared in the same manner as in Example 1 except that the inorganic filler was replaced by 32 parts by mass of silica slurry filler (trade name: SIRMEK50WT %-M01, manufactured by CIK-Nano Tek.; average particle diameter (d50): 0.8 μm; particle diameter (d90) at 90% cumulative distribution frequency: 1.0 μm; solid content 50% (organic solvent: MEK)) (including 16 parts by mass of the silica filler).

Example 8

A release film-attached film-shaped transparent adhesive was prepared in the same manner as in Example 1 except that the inorganic filler was replaced by 122 parts by mass of silica slurry filler (trade name: SIRMEK50WT %-M01, manufactured by CIK-Nano Tek.; average particle diameter (d50): 0.8 μm; particle diameter (d90) at 90% cumulative distribution frequency: 1.0 μm; solid content 50% (organic solvent: MEK)) (including 61 parts by mass of the silica filler).

Example 9

A release film-attached film-shaped transparent adhesive was prepared in the same manner as in Example 1 except that the inorganic filler was replaced by 286 parts by mass of silica slurry filler (trade name: SIRMEK50WT %-M01, manufactured by CIK-Nano Tek.; average particle diameter (d50): 0.8 μm; particle diameter (d90) at 90% cumulative distribution frequency: 1.0 μm; solid content 50% (organic solvent: MEK)) (including 143 parts by mass of the silica filler).

Example 10

A release film-attached film-shaped transparent adhesive was prepared in the same manner as in Example 9 except that the epoxy resin-curing agent was replaced by 7.5 parts by mass of crushed dicyandiamide (trade name: DICY7, manufactured by Mitsubishi Chemical Corporation; average particle diameter (d50): 0.5 μm; particle diameter (d90) at 90% cumulative distribution frequency: 0.95 μm; solubility in MEK at 25° C.: less than 0.01 g/100 g-MEK).

Example 11

A release film-attached film-shaped transparent adhesive was prepared in the same manner as in Example 9 except that the epoxy resin-curing agent was replaced by 28.5 parts by mass of crushed organic acid hydrazide (trade name: N14, manufactured by Mitsubishi Chemical Corporation; average particle diameter (d50): 0.8 μm; particle diameter (d90) at 90% cumulative distribution frequency: 2.0 μm; solubility in MEK at 25° C.: less than 0.01 g/100 g-MEK).

Example 12

A release film-attached film-shaped transparent adhesive was prepared in the same manner as in Example 10 except that no silica slurry filler (trade name: SIRMEK50WT %-M01, manufactured by CIK-Nano Tek.; average particle diameter (d50): 0.8 μm; particle diameter (d90) at 90% cumulative distribution frequency: 1.0 μm; solid content 50% (organic solvent: MEK)) was used.

Comparative Example 1

A release film-attached film-shaped transparent adhesive was prepared in the same manner as in Example 3 except that the epoxy resin-curing agent was replaced by 8.5 parts by mass of uncrushed imidazole compound (trade name: 2PHZ-PW, manufactured by Shikoku Chemicals Corporation; average particle diameter (d50): 1.9 μm; particle diameter (d90) at 90% cumulative distribution frequency: 3.9 μm; solubility in MEK at 25° C.: less than 0.01 g/100 g-MEK).

Comparative Example 2

A release film-attached film-shaped transparent adhesive was prepared in the same manner as in Comparative Example 1 except that the usage of the silica slurry filler (trade name: YA010C-MFN, manufactured by Admatechs Co., Ltd.; average particle diameter (d50): 0.01 μm; particle diameter (d90) at 90% cumulative distribution frequency: 0.1 μm; solid content 30% (organic solvent: MEK)) was replaced by 713 parts by mass (including 214 parts by mass of the silica filler).

Comparative Example 3

A release film-attached film-shaped transparent adhesive was prepared in the same manner as in Comparative Example 1 except that the inorganic filler was replaced by 238 parts by mass of silica slurry filler (trade name: YC100C-MLA, manufactured by Admatechs Co., Ltd.; average particle diameter (d50): 0.1 μm; particle diameter (d90) at 90% cumulative distribution frequency: 0.3 μm; solid content 60% (organic solvent: MEK)) (including 143 parts by mass of the silica filler).

Comparative Example 4

A release film-attached film-shaped transparent adhesive was prepared in the same manner as in Comparative Example 1 except that the inorganic filler was replaced by 357 parts by mass of silica slurry filler (trade name: YC100C-MLA, manufactured by Admatechs Co., Ltd.; average particle diameter (d50): 0.1 μm; particle diameter (d90) at 90% cumulative distribution frequency: 0.3 μm; solid content 60% (organic solvent: MEK)) (including 214 parts by mass of the silica filler).

Comparative Example 5

A release film-attached film-shaped transparent adhesive was prepared in the same manner as in Comparative Example 3 except that the epoxy resin-curing agent was replaced by 7.5 parts by mass of uncrushed dicyandiamide (trade name: DICY7, manufactured by Mitsubishi Chemical Corporation; average particle diameter (d50): 7.1 μm; particle diameter (d90) at 90% cumulative distribution frequency: 15.0 μm; solubility in MEK at 25° C.: less than 0.01 g/100 g-MEK).

Comparative Example 6

A release film-attached film-shaped transparent adhesive was prepared in the same manner as in Comparative Example 1 except that the inorganic filler was replaced by 272 parts by mass of silica slurry filler (trade name: YC100C-MLA, manufactured by Admatechs Co., Ltd.; average particle diameter (d50): 0.1 μm; particle diameter (d90) at 90% cumulative distribution frequency: 0.3 μm; solid content 60% (organic solvent: MEK)) (including 163 parts by mass of the silica filler) and the epoxy resin-curing agent was replaced by 28.5 parts by mass of uncrushed organic acid hydrazide (trade name: N14, Mitsubishi Chemical Corporation; average particle diameter (d50): 0.8 μm; particle diameter (d90) at 90% cumulative distribution frequency: 5.3 μm; solubility in MEK at 25° C.: less than 0.01 g/100 g-MEK).

Comparative Example 7

A release film-attached film-shaped transparent adhesive was prepared in the same manner as in Comparative Example 1 except that the inorganic filler was replaced by 204 parts by mass of silica slurry filler (trade name: SC2050-MNU, manufactured by Admatechs Co., Ltd.; average particle diameter (d50): 0.8 μm; particle diameter (d90) at 90% cumulative distribution frequency: 5.0 μm; solid content 70% (organic solvent: MEK)) (including 143 parts by mass of the silica filler).

Comparative Example 8

A release film-attached film-shaped transparent adhesive was prepared in the same manner as in Example 12 except that the epoxy resin-curing agent was replaced by 8.5 parts by mass of uncrushed imidazole compound (trade name: 2MZ-H, manufactured by Shikoku Chemicals Corporation; average particle diameter (d50): 3.2 μm; particle diameter (d90) at 90% cumulative distribution frequency: 8.2 μm; solubility in MEK at 25° C.: less than 5.3 g/100 g-MEK).

Comparative Example 9

A release film-attached film-shaped transparent adhesive was prepared in the same manner as in Example 12 except that the epoxy resin-curing agent was replaced by 8.5 parts by mass of crushed imidazole compound (trade name: 2MZ-H, manufactured by Shikoku Chemicals Corporation; average particle diameter (d50): 0.15 μm; particle diameter (d90) at 90% cumulative distribution frequency: 0.8 μm; solubility in MEK at 25° C.: less than 5.3 g/100 g-MEK).

Comparative Example 10

A release film-attached film-shaped transparent adhesive was prepared in the same manner as in Example 12 except that the epoxy resin-curing agent was replaced by 8.5 parts by mass of uncrushed imidazole compound (trade name: 2E4MZ, manufactured by Shikoku Chemicals Corporation; average particle diameter (d50): 2.2 μm; particle diameter (d90) at 90% cumulative distribution frequency: 5.4 μm; solubility in MEK at 25° C.: 10 g or more/100 g-MEK).

Comparative Example 11

A release film-attached film-shaped transparent adhesive was prepared in the same manner as in Example 12 except that the epoxy resin-curing agent was replaced by 8.5 parts by mass of crushed imidazole compound (trade name: 2E4MZ, manufactured by Shikoku Chemicals Corporation; average particle diameter (d50): 0.55 μm; particle diameter (d90) at 90% cumulative distribution frequency: 0.9 μm; solubility in MEK at 25° C.: 10 g or more/100 g-MEK).

Comparative Example 12

A release film-attached film-shaped transparent adhesive was prepared in the same manner as in Comparative Example 1 except that no silica slurry filler (trade name: YA010C-MFN, manufactured by Admatechs Co., Ltd.; average particle diameter (d50): 0.01 μm; particle diameter (d90) at 90% cumulative distribution frequency: 0.1 μm; solid content 30% (organic solvent: MEK)) was used.

The particle diameter of the epoxy resin-curing agent used in each of Examples or Comparative Examples was adjusted by the following pulverization.

(Crushing Treatment of Epoxy Resin-Curing Agent)

Each epoxy resin-curing agent was treated with a dry pulverizer (trade name: Dry burst parallel DB-180 WP, manufactured by SUGINO MACHINE LIMITED) at a rotation speed of 5000 rev/min for 3 hours.

The particle diameter distribution of the epoxy resin-curing agent used in each of Examples or Comparative Examples before or after the pulverization was measured as follows.

(Measurement of Particle Diameter Distribution of Curing Agent Before or after Crushing Treatment)

First, 0.1 g of the epoxy resin-curing agent before or after the crushing treatment and 9.9 g of isopropyl alcohol (IPA) were weighed, and the mixture was subjected to ultrasonic dispersion treatment for 5 minutes to prepare a measurement sample. The average particle diameter (d50) and the particle diameter at 90% cumulative distribution frequency (d90) of this measurement sample were determined from the cumulative curve of the volume fraction of the particle diameter in the particle diameter distribution measured by laser diffraction/scattering (model: LMS-2000e, manufactured by Seishin Enterprise Co., Ltd.). The results are shown in Table 1.

The solubility of the epoxy resin-curing agent, which was used in each of Examples or Comparative Examples, in 100 g of a solvent (MEK) was determined as follows.

(Solubility of Epoxy Resin-Curing Agent (g/100 g-MEK))

First, 10 g of each epoxy resin-curing agent was weighed and added to a beaker, and 100 g of MEK was added and stirred with a magnetic stirrer at room temperature (25° C.) for a predetermined time (60 minutes). After the stirring, the insoluble epoxy resin-curing agent was collected by filtration, the amount X g of the insoluble epoxy resin-curing agent was measured, and the solubility was calculated as (10−X) g.

TABLE 1

| Kind of epoxy resin-curing agent | Crushing treatment | Average particle diameter (d50) [μm] | Particle diameter (d90) at 90% cumulative distribution frequency [μm] | Solubility in MEK (25° C.) [g/100 g-MEK] |
|---|---|---|---|---|
| 2PHZ-PW | Before | 1.90 | 3.90 | Less than 0.01 |
| (imidazole compound) | After | 0.15 | 0.39 | |
| DICY7 | Before | 7.10 | 15.0 | Less than 0.01 |
| (dicyandiamide compound) | After | 0.50 | 0.95 | |
| N14 | Before | 5.30 | 18.0 | Less than 0.01 |
| (hydrazide compound) | After | 0.80 | 2.00 | |

TABLE 1-continued

| Kind of epoxy resin-curing agent | Crushing treatment | Average particle diameter (d50) [μm] | Particle diameter (d90) at 90% cumulative distribution frequency [μm] | Solubility in MEK (25° C.) [g/100 g-MEK] |
|---|---|---|---|---|
| 2MZ-H | Before | 3.20 | 8.20 | 5.3 |
| (imidazole compound) | After | 0.15 | 0.80 | |
| 2E4MZ | Before | 2.20 | 5.40 | 10 or more |
| (imidazole compound) | After | 0.55 | 0.90 | |

The particle diameter distribution of the inorganic filler used in each of Examples or Comparative Examples was measured by the same method as described above (measurement of particle diameter distribution of curing agent before or after crushing treatment).

In each of Examples or Comparative Examples, the haze and the melt viscosity were measured and the die attachment, the visibility, and the storage stability were evaluated by the following protocols. The results are shown in Tables 2 and 3.

<Measurement of Haze>

A square having a size of length 5.0 cm×width 5.0 cm was cut out from the release film-attached film-shaped transparent adhesive obtained in each of Examples or Comparative Examples, and the film-shaped transparent adhesive was thermally cured by heating at a temperature of 180° C. for 1 hour. The haze of the thermally cured film-shaped transparent adhesive was measured with a haze meter (model: HZ-V3, manufactured by Suga Test Instruments Co., Ltd.) using light from a light source D65 with a measurement hole diameter of 20 mmφ.

<Measurement of Melt Viscosity>

Squares having a size of length 5.0 cm×width 5.0 cm were cut out from the release film-attached film-shaped transparent adhesive obtained in each of Examples or Comparative Examples. The cut samples in a state in which the release film had been peeled off were laminated and bonded on a stage at 70° C. by a hand roller. Thus, a test piece having a thickness of approximately 1.0 mm was obtained. A change in viscosity resistance in a temperature range of 20 to 250° C. at a heating rate of 5° C./min was measured for this test piece by using a rheometer (RS6000, manufactured by Haake). The melt viscosities at 120° C. (Pa·s) were each calculated from the obtained temperature-viscosity resistance curve.

<Evaluation of Die Attachment>

The release film-attached film-shaped transparent adhesive obtained in each of Examples or Comparative Examples was first bonded to one surface of a dummy silicon wafer (size: 8 inch, thickness: 100 μm) by using a manual laminator (trade name: FM-114, manufactured by Technovision, Inc.) at a temperature of 70° C. and a pressure of 0.3 MPa. Thereafter, the release film was peeled off from the film-shaped transparent adhesive. Then, a dicing tape (trade name: K-13, manufactured by Furukawa Electric Co., Ltd.) and a dicing frame (trade name: DTF2-8-1H001, manufactured by DISCO Corporation) were bonded on a surface of the film-shaped transparent adhesive opposite to the dummy silicon wafer, by using the same manual laminator at room temperature and a pressure of 0.3 MPa. Then, dicing was performed from the dummy silicon wafer side to form squares each having a size of 10 mm×10 mm by using a dicing apparatus (trade name: DFD-6340, manufactured by DISCO Corporation) equipped with two axes of dicing blades (Z1: NBC-ZH2050 (27HEDD), manufactured by DISCO Corporation/Z2: NBC-ZH127F-SE(BC), manufactured by DISCO Corporation) to prepare a dummy chip with a film-shaped transparent adhesive.

Next, the dummy chip with a film-shaped transparent adhesive was picked up from the dicing tape by using a die bonder (trade name: DB-800, manufactured by Hitachi High-Tech Corporation). Then, the film-shaped transparent adhesive side of the dummy chip with a film-shaped transparent adhesive was thermocompression bonded to the mounting surface side of a lead frame substrate (42Alloy-based, manufactured by Toppan Printing Co., Ltd.) under a condition at a temperature of 120° C., a pressure of 0.1 MPa (load: 400 gf) for 1.0 second. Here, the mounting surface of the lead frame substrate is a metal surface having slight surface roughness.

The presence or absence of voids at the interface between the film-shaped transparent adhesive and the mounting surface of the lead frame substrate was observed for the dummy chip with a film-shaped transparent adhesive which had been thermocompression bonded on the substrate, by using a scanning acoustic tomograph (SAT) (FS300III, manufactured by Hitachi Power Solutions Co., Ltd.). Then, the die attachment was evaluated based on the following criteria. In this test, the evaluation rank "A" is an acceptable level.

Evaluation Criteria

A: No void is observed in all the 24 dummy chips mounted.

B: Voids are observed in 1 or more and 3 or less of the 24 dummy chips mounted.

C: Voids are observed in 4 or more of the 24 dummy chips mounted.

<Evaluation of Visibility>

The visibility was evaluated as an indicator of transparency.

Each release film-attached film-shaped transparent adhesive obtained in each of Examples or Comparative Examples was bonded to a surface of a silicon chip (size: 10×10 mm; thickness 350 μm) having an alignment mark: L mark (100 μm on each side) by using a hand roller on a stage at 70° C. The resulting material was heated at a temperature of 180° C. for 1 hour to thermally cure the film-shaped transparent adhesive. The release film was peeled off, and a dicing tape (trade name: K-13, manufactured by Furukawa Electric Co., Ltd.) and a dicing frame (trade name: DTF2-8-1H001, manufactured by DISCO Corporation) were adhered onto a surface of the silicon chip opposite to the surface to which the film-shaped transparent adhesive was attached. Next, the alignment mark on the chip surface was checked through the thermally cured film-shaped transparent adhesive in a die bonder (trade name: DB-800, manufactured by Hitachi High-Technologies Corporation), and the visibility was evaluated based on the following evaluation criteria. The evaluation was performed by adjusting the luminance of illumination provided in the die bonder to 30 to 70%. In this test, the evaluation rank "A" is an acceptable level.

Evaluation Criteria

AA: 24 semiconductor chips tested can be detected in a luminance range of 30 to 70% in a die bonder.

A: 24 semiconductor chips tested cannot be detected in a luminance range of 30% or more and less than 50%, but can be detected in a luminance range of 50 to 70% in a die bonder.

B: in 1 or more and 3 or less of 24 silicon chips tested, a detection error occurs in a luminance range of 50 to 70% in a die bonder.

C: in 4 or more of 24 silicon chips tested, a detection error occurs in a luminance range of 50 to 70% in a die bonder.

Here, the luminance of 100% refers to the maximum brightness of illumination provided in the die bonder. As the luminance increases, the influence (by the epoxy resin-curing agent, the inorganic filler, etc.) of a region having a refractive index different from that of the resin component in the film-shaped transparent adhesive on the detection of the alignment mark may decrease. However, if the luminance exceeds 70%, the alignment mark itself is instead hard to detect. In the above test, whether the alignment mark can be detected in a luminance range of 30 to 70% was evaluated. The alignment mark can be detected using any die bonder (e.g., even if the die bonder is used up and the luminance is reduced) as long as the film-shaped transparent adhesive is evaluated as AA. Even when the alignment mark cannot be detected in the range of 30% or more and less than 50% but the alignment mark can be detected in a luminance range of 50 to 70% (evaluation: A), the alignment mark can be sufficiently detected by adjusting the luminance as necessary using a regular device (not a used die bonder in which the luminance is extremely lowered).

<Storage Stability Test>

Each test piece having length 5.0 cm×width 5.0 cm×thickness about 1.0 mm as prepared when the melt viscosity was measured was stored for 30 days under an environment at a temperature of 25° C.±2° C. and a relative humidity of 60% RH±5%. A change in viscosity resistance in a temperature range of 20 to 250° C. at a heating rate of 5° C./min was measured for this test piece by using a rheometer (RS6000, manufactured by Haake). The melt viscosities at 120° C. (Pa·s) were each calculated from the obtained temperature-viscosity resistance curve. The melt viscosity thus obtained was defined as the melt viscosity of the test piece after storage. Further, the melt viscosity of the test piece as measured in the melt viscosity measurement was defined as the melt viscosity of the test piece before storage. The melt viscosity of the test piece before storage was defined as "$V_A$" (initial value), the melt viscosity of the test piece after storage was defined as "$V_B$", the rate of change of $V_B$ with respect to $V_A$(=($V_B$−$V_A$)/$V_A$×100(%)/0)) was determined, and the storage stability was evaluated based on the following evaluation criteria. In this test, the evaluation rank "A" is an acceptable level.

Evaluation Criteria

A: The rate of change in the melt viscosity of the test piece after storage with respect to the initial value is more than −1% and less than +1%.

B: The rate of change in the melt viscosity of the test piece after storage with respect to the initial value is more than −5% and −1% or less, or +1% or more and less than +5%.

C: The rate of change in the melt viscosity of the test piece after storage with respect to the initial value is −5% or less or +5% or more.

TABLE 2

| | | | Example | | | | | |
|---|---|---|---|---|---|---|---|---|
| | | | 1 | 2 | 3 | 4 | 5 | 6 |
| Adhesive layer [parts by mass] | Epoxy resin | EPPN-501H (triphenylmethane-type epoxy resin) | 56 | 56 | 56 | 56 | 56 | 56 |
| | | YD-128 (liquid bisA-type epoxy resin) | 49 | 49 | 49 | 49 | 49 | 49 |
| | Phenoxy resin | YP-50 (bisA-type phenoxy resin, Tg 84° C., elastic modulus 1700 MPa) | 30 | 30 | 30 | 30 | 30 | 30 |
| | Inorganic filler | YA010C-MFN | 16 | 61 | 143 | | | |
| | | YC100C-MLA | | | | 16 | 61 | 143 |
| | | SIRMEK50 WT %-M01 | | | | | | |
| | Epoxy resin-curing agent | 2PHZ-PW (imidazole-based curing agent) crushed product | 8.5 | 8.5 | 8.5 | 8.5 | 8.5 | 8.5 |
| | | DICY7 (dicyandiamide curing agent) crushed product | | | | | | |
| | | N14 (hydrazide-based curing agent) crushed product | | | | | | |
| Total solid content | | | 159 | 204 | 286 | 159 | 204 | 286 |
| Amount of inorganic filler (wt %) | | | 10% | 30% | 50% | 10% | 30% | 50% |
| Amount of epoxy resin-curing agent (wt %) | | | 5.4% | 4.2% | 3.0% | 5.4% | 4.2% | 3.0% |
| Amount of epoxy resin-curing agent per 100 parts by mass of epoxy resin (parts by mass) | | | 8.2 | 8.2 | 8.2 | 8.2 | 8.2 | 8.2 |
| Haze value | | | 24% | 30% | 36% | 39% | 43% | 44% |
| Melt viscosity @ 120° C. (Pa · s) | | | 1000 | 3000 | 8500 | 580 | 1300 | 2100 |
| Die attachment evaluation | | | A | A | A | A | A | A |
| Visibility evaluation | | | AA | AA | AA | AA | A | A |
| Storage stability | | | A | A | A | A | A | A |

TABLE 2-continued

| | | | Example | | | | | |
|---|---|---|---|---|---|---|---|---|
| | | | 7 | 8 | 9 | 10 | 11 | 12 |
| Adhesive layer [parts by mass] | Epoxy resin | EPPN-501H (triphenylmethane-type epoxy resin) | 56 | 56 | 56 | 56 | 56 | 56 |
| | | YD-128 (liquid bisA-type epoxy resin) | 49 | 49 | 49 | 49 | 49 | 49 |
| | Phenoxy resin | YP-50 (bisA-type phenoxy resin, Tg 84° C., elastic modulus 1700 MPa) | 30 | 30 | 30 | 30 | 30 | 30 |
| | Inorganic filler | YA010C-MFN | | | | | | |
| | | YC100C-MLA | | | | | | |
| | | SIRMEK50 WT %-M01 | 16 | 61 | 143 | 143 | 163 | |
| | Epoxy resin-curing agent | 2PHZ-PW (imidazole-based curing agent) crushed product | 8.5 | 8.5 | 8.5 | | | |
| | | DICY7 (dicyandiamide curing agent) crushed product | | | | 7.5 | | 7.5 |
| | | N14 (hydrazide-based curing agent) crushed product | | | | | 28.5 | |
| Total solid content | | | 159 | 204 | 286 | 285 | 326 | 142 |
| Amount of inorganic filler (wt %) | | | 10% | 30% | 50% | 50% | 50% | 0% |
| Amount of epoxy resin-curing agent (wt %) | | | 5.4% | 4.2% | 3.0% | 2.6% | 8.8% | 5.3% |
| Amount of epoxy resin-curing agent per 100 parts by mass of epoxy resin (parts by mass) | | | 8.2 | 8.2 | 8.2 | 7.2 | 27.4 | 7.2 |
| Haze value | | | 41% | 42% | 48% | 44% | 50% | 5% |
| Melt viscosity @ 120° C. (Pa · s) | | | 500 | 1200 | 1600 | 1550 | 3200 | 130 |
| Die attachment evaluation | | | A | A | A | A | A | A |
| Visibility evaluation | | | A | A | A | A | A | AA |
| Storage stability | | | A | A | A | A | A | A |

TABLE 3

| | | | Comparative Example | | | | | |
|---|---|---|---|---|---|---|---|---|
| | | | 1 | 2 | 3 | 4 | 5 | 6 |
| Adhesive layer [parts by mass] | Epoxy resin | EPPN-501H (triphenylmethane-type epoxy resin) | 56 | 56 | 56 | 56 | 56 | 56 |
| | | YD-128 (liquid bisA-type epoxy resin) | 49 | 49 | 49 | 49 | 49 | 49 |
| | Phenoxy resin | YP-50 (bisA-type phenoxy resin, Tg 84° C., elastic modulus 1700 MPa) | 30 | 30 | 30 | 30 | 30 | 30 |
| | Inorganic filler | YA010C-MFN | 143 | 214 | | | | |
| | | YC100C-MLA | | | 143 | 214 | 143 | 163 |
| | | SC2050-MNU | | | | | | |
| | Epoxy resin-curing agent | 2PHZ-PW (imidazole-based curing agent) untreated product | 8.5 | 8.5 | 8.5 | 8.5 | | |
| | | DICY7 (dicyandiamide curing agent) untreated product | | | | | 7.5 | |
| | | N14 (hydrazide-based curing agent) untreated product | | | | | | 28.5 |
| | | 2MZ-H (imidazole-based curing agent) untreated product | | | | | | |
| | | 2MZ-H (imidazole-based curing agent) crushed product | | | | | | |
| | | 2E4MZ (imidazole-based curing agent) untreated product | | | | | | |
| | | 2E4MZ (imidazole-based curing agent) crushed product | | | | | | |
| Total solid content | | | 286 | 357 | 286 | 357 | 285 | 326 |
| Amount of inorganic filler (wt %) | | | 50% | 60% | 50% | 60% | 50% | 50% |
| Amount of epoxy resin-curing agent (wt %) | | | 3.0% | 2.4% | 3.0% | 2.4% | 2.6% | 8.8% |
| Amount of epoxy resin-curing agent per 100 parts by mass of epoxy resin (parts by mass) | | | 8.2 | 8.2 | 8.2 | 8.2 | 7.2 | 27.4 |
| Haze value | | | 56% | 58% | 62% | 64% | 61% | 65% |
| Melt viscosity @ 120° C. (Pa · s) | | | 8300 | 18000 | 2000 | 11000 | 1800 | 2900 |
| Die attachment evaluation | | | A | C | A | B | A | A |
| Visibility evaluation | | | B | B | B | B | B | B |
| Storage stability | | | A | A | A | A | A | A |

| | | | Comparative Example | | | | | |
|---|---|---|---|---|---|---|---|---|
| | | | 7 | 8 | 9 | 10 | 11 | 12 |
| Adhesive layer [parts by mass] | Epoxy resin | EPPN-501H (triphenylmethane-type epoxy resin) | 56 | 56 | 56 | 56 | 56 | 56 |
| | | YD-128 (liquid bisA-type epoxy resin) | 49 | 49 | 49 | 49 | 49 | 49 |
| | Phenoxy resin | YP-50 (bisA-type phenoxy resin, Tg 84° C., elastic modulus 1700 MPa) | 30 | 30 | 30 | 30 | 30 | 30 |
| | Inorganic filler | YA010C-MFN | | | | | | |
| | | YC100C-MLA | | | | | | |
| | | SC2050-MNU | 143 | | | | | |

TABLE 3-continued

| | | | | | | | |
|---|---|---|---|---|---|---|---|
| Epoxy resin-curing agent | 2PHZ-PW (imidazole-based curing agent) untreated product | 8.5 | | | | | 8.5 |
| | DICY7 (dicyandiamide curing agent) untreated product | | | | | | |
| | N14 (hydrazide-based curing agent) untreated product | | | | | | |
| | 2MZ-H (imidazole-based curing agent) untreated product | | 8.5 | | | | |
| | 2MZ-H (imidazole-based curing agent) crushed product | | | 8.5 | | | |
| | 2E4MZ (imidazole-based curing agent) untreated product | | | | 8.5 | | |
| | 2E4MZ (imidazole-based curing agent) crushed product | | | | | 8.5 | |
| Total solid content | | 286 | 143 | 143 | 143 | 143 | 143 |
| Amount of inorganic filler (wt %) | | 50% | 0% | 0% | 0% | 0% | 0% |
| Amount of epoxy resin-curing agent (wt %) | | 3.0% | 6.0% | 6.0% | 6.0% | 6.0% | 6.0% |
| Amount of epoxy resin-curing agent per 100 parts by mass of epoxy resin (parts by mass) | | 8.2 | 8.2 | 8.2 | 8.2 | 8.2 | 8.2 |
| Haze value | | 95% | 52% | 10% | 54% | 8% | 52% |
| Melt viscosity @ 120° C. (Pa · s) | | 800 | 140 | 145 | 150 | 160 | 120 |
| Die attachment evaluation | | A | A | A | A | A | A |
| Visibility evaluation | | C | B | A | B | A | B |
| Storage stability | | A | B | B | C | C | A |

<Notes of Tables>

Each empty space in a row of the adhesive layer means that the corresponding component is not included.

Liquid bisA-type epoxy resin: bisphenol A-type epoxy resin

BisA-type phenoxy resin: bisphenol A-type phenoxy resin

The following is clear from Tables 1 and 2.

All of the film-shaped transparent adhesives, each obtained using a transparent adhesive composition containing an epoxy resin-curing agent that did not satisfy the requirements of the present invention, according to Comparative Examples 1 to 12 failed in at least one of the visibility evaluation or the storage stability evaluation. Further, Comparative Examples 2 and 4 also failed in the die attachment evaluation.

By contrast, the film-shaped transparent adhesives, each obtained using the adhesive composition of any of Examples 1 to 12 satisfying the requirements of the present invention, had excellent visibility and storage stability, and also exhibited excellent die attachment. In particular, even when a large amount of epoxy resin-curing agent was added to the epoxy resin (e.g., when the epoxy resin-curing agent is included in an amount of 2.0 parts by mass or more based on 100 parts by mass of the epoxy resin), the film-shaped transparent adhesives had excellent visibility.

Having described our invention as related to the present embodiments, it is our intention that the invention not be limited by any of the details of the description, unless otherwise specified, but rather be construed broadly within its spirit and scope as set out in the accompanying claims.

DESCRIPTION OF SYMBOLS

1 Semiconductor wafer
2 Adhesive layer (film-shaped transparent adhesive)
3 Dicing tape
4 Semiconductor chip
5 Film-shaped transparent adhesive-attached semiconductor chip
6 Circuit board
7 Bonding wire
8 Sealing resin
9 Semiconductor package

The invention claimed is:

1. A transparent adhesive composition, comprising:

an epoxy resin (A), an epoxy resin-curing agent (B), and a phenoxy resin (C), wherein the epoxy resin-curing agent (B) satisfies the following (1) and (2):

(1) the epoxy resin-curing agent (B) is in a powdery form and has a particle diameter (d90) at 90% cumulative distribution frequency of 2.0 μm or less; and (2) the epoxy resin-curing agent (B) has solubility in 100 g of methyl ethyl ketone at 25° C. of 0.1 g or less.

2. The transparent adhesive composition according to claim 1, comprising a silica filler (D1), wherein the silica filler (D1) satisfies the following (3) and (4):

(3) the silica filler (D1) has an average particle diameter (d50) of from 0.01 to 0.3 μm; and (4) the silica filler (D1) has a particle diameter (d90) at 90% cumulative distribution frequency of 1.0 μm or less, and wherein a percentage of a content of the silica filler (D1) to a total of contents of the epoxy resin (A), the epoxy resin-curing agent (B), the phenoxy resin (C), and the silica filler (D1) is from 10 to 50 mass %.

3. The transparent adhesive composition according to claim 1, wherein the epoxy resin-curing agent (B) comprises a dicyandiamide compound, an imidazole compound, or a hydrazide compound.

4. The transparent adhesive composition according to claim 1, wherein a content of the epoxy resin-curing agent (B) based on 100 parts by mass of the epoxy resin (A) is from 4 to 20 parts by mass.

5. A film-shaped transparent adhesive, which is obtained by forming a film of the transparent adhesive composition according to claim 1.

6. The film-shaped transparent adhesive according to claim 5, which has a haze value of 50% or less after thermal curing.

7. The film-shaped transparent adhesive according to claim 5, wherein when the film-shaped transparent adhesive before thermal curing is heated from 25° C. at a heating rate of 5° C./min, a melt viscosity at 120° C. reaches a range of 100 to 10,000 Pa·s.

8. The film-shaped transparent adhesive according to claim 5, which has a thickness of from 1 to 100 μm.

9. A method of producing a transparent adhesive cured layer-attached member, comprising the steps of:

thermocompression bonding the film-shaped transparent adhesive according to claim 5 onto an adherend; and thermally curing the film-shaped transparent adhesive.

10. A method of producing an electronic component, comprising the steps of:

a first step of thermocompression bonding the film-shaped transparent adhesive according to claim 5 to a surface of a wafer and providing a dicing tape via the film-shaped transparent adhesive;

a second step of dicing the wafer and the film-shaped transparent adhesive simultaneously to obtain a wafer chip with a transparent adhesive layer on the dicing tape;

a third step of removing the dicing tape from the transparent adhesive layer and thermocompression bonding the transparent adhesive layer-attached wafer chip and another member via the transparent adhesive layer; and a fourth step of thermally curing the transparent adhesive layer.

11. An electronic component, which is obtained by bonding a wafer chip and a circuit board and/or wafer chips to each other by using a thermally cured product of the film-shaped transparent adhesive according to claim 5.

12. The transparent adhesive composition according to claim 1, wherein the epoxy resin-curing agent (B) includes an imidazole compound, a curing catalyst composite-based polyhydric phenol compound, a hydrazide compound, a boron trifluoride-amine complex, an amine imide compound, or a polyamine salt, a modified product thereof, or those of a microcapsule type.

13. The transparent adhesive composition according to claim 1, wherein the epoxy resin-curing agent (B) includes an imidazole compound or a hydrazide compound.

* * * * *